(12) United States Patent
Hagane et al.

(10) Patent No.: US 12,172,306 B2
(45) Date of Patent: Dec. 24, 2024

(54) ECCENTRIC OSCILLATION GEAR DEVICE, ROBOT, INDUSTRIAL MACHINE AND METHOD OF ASSEMBLING ECCENTRIC OSCILLATION GEAR DEVICE

(71) Applicant: Nabtesco Corporation, Tokyo (JP)

(72) Inventors: Mamoru Hagane, Tokyo (JP); Yoshiaki Makizoe, Tokyo (JP); Takahide Kumagai, Tokyo (JP); Yusuke Nakashima, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 196 days.

(21) Appl. No.: 18/081,216

(22) Filed: Dec. 14, 2022

(65) Prior Publication Data

US 2023/0249335 A1    Aug. 10, 2023

(30) Foreign Application Priority Data

Dec. 15, 2021  (JP) ................................ 2021-203534
Dec. 12, 2022  (JP) ................................ 2022-197973

(51) Int. Cl.
  *B25J 9/10*  (2006.01)
  *B25J 17/02*  (2006.01)
  *F16H 1/32*  (2006.01)
  *F16H 19/08*  (2006.01)
  *F16H 57/02*  (2012.01)

(52) U.S. Cl.
CPC ............. *B25J 9/10* (2013.01); *B25J 17/0258* (2013.01); *F16H 1/32* (2013.01); *F16H 19/08* (2013.01); *F16H 2057/02026* (2013.01); *F16H 2057/02073* (2013.01)

(58) Field of Classification Search
CPC .. F16H 1/32; F16H 19/08; F16H 2057/02026; F16H 2057/02073
See application file for complete search history.

(56) References Cited

U.S. PATENT DOCUMENTS 5,802,954 A  *  9/1998  Ikeda .................. F04B 27/1063
                                          411/176
11,732,778 B2 *  8/2023  Makisumi ................. F16C 3/18
                                          74/413

FOREIGN PATENT DOCUMENTS

DE   102016205975 A1   11/2016
JP      2015-113917 A    6/2015
JP      2015-197158 A   11/2015
(Continued)

OTHER PUBLICATIONS

Extended European Search Report dated Apr. 24, 2023, issued in corresponding European Patent Application No. 22213107.0 (9 pgs.).

*Primary Examiner* — Jake Cook
(74) *Attorney, Agent, or Firm* — Pillsbury Winthrop Shaw Pittman, LLP

(57) ABSTRACT

An eccentric oscillation gear device includes a casing, a first member supported by the casing via a first bearing, a second member supported by the casing via a second bearing, and a fastening portion fastening the first and second members in an axial direction of the casing. The fastening portion includes an internally threaded portion formed in the first member, and a fastener having an externally threaded portion. The fastener has a Rockwell hardness (HRC) of 44 or higher, and the internally threaded portion has a lower hardness than the fastener.

11 Claims, 12 Drawing Sheets

(56) References Cited

FOREIGN PATENT DOCUMENTS

| JP | 2016-109264 A | 6/2016 |
|----|---------------|--------|
| JP | 2020-024024 A | 2/2020 |

\* cited by examiner

ECCENTRIC OSCILLATION GEAR DEVICE, ROBOT, INDUSTRIAL MACHINE AND METHOD OF ASSEMBLING ECCENTRIC OSCILLATION GEAR DEVICE

CROSS-REFERENCE TO RELATED APPLICATIONS

This application is based on and claims the benefit of priority from Japanese Patent Application Serial Nos. 2021-203534 (filed on Dec. 15, 2021) and 2022-197973 (filed on Dec. 12, 2022), the contents of which are incorporated herein.

TECHNICAL FIELD

The present disclosure relates to an eccentric oscillation gear device, a robot, an industrial machine and a method of assembling eccentric oscillation gear device.

BACKGROUND

In the conventional art, known eccentric oscillation gear devices are provided, for example, as transmissions (speed reducers) on robots such as industrial robots. Such an eccentric oscillation gear device includes a relatively rotatable carrier, as disclosed in, e.g., Japanese Patent Application Publication No. 2016-109264). The carrier is composed of a hold and a shaft portion. The hold and the shaft portion are fastened together with a plurality of fasteners (bolts). The plurality of bolts are arranged around the axis of the carrier. The hold and the shaft portion, which are fastened together with the plurality of bolts, rotate relative to a casing.

In the conventional art, however, the frictional force on the fastening surface between the hold and the shaft portion could vary among the fasteners (bolts) that fasten the hold and the shaft portion together. The variation in frictional force causes instability in the axial tension between the hold and the shaft portion. If such is the case, main bearings may disadvantageously not be preloaded evenly.

SUMMARY

One object of the disclosure is to provide an eccentric oscillation gear device, a robot, an industrial machine and a method of assembling an eccentric oscillation gear device capable of stabilizing the axial tension between the hold and the shaft portion, improving the stability of fastening, as well as improving the stability of rotation.

(1) To solve the problems, an eccentric oscillation gear device according to one aspect of the present disclosure includes: a casing; a first member supported by the casing via a first bearing; a second member supported by the casing via a second bearing; and a fastening portion fastening the first and second members in an axial direction of the casing. The fastening portion includes: an internally threaded portion formed in the first member; and a fastener having an externally threaded portion. The fastener has a Rockwell hardness (HRC) of 44 or higher, and the internally threaded portion has a lower hardness than the fastener.

According to the above-described configurations, the threads of the externally threaded portion having the above-mentioned hardness can plastically deform the rough surface or micro projections of the threads of the internally threaded portion when the first and second members are fastened. Therefore, in the fastening portion, an increased area of contact can be obtained between the threads of the externally threaded portion and the threads of the internally threaded portion. This can reduce the variation in fastening force. Accordingly, the axial tension between the first and second members can be stabilized. At the same time, since the externally threaded portion has a higher hardness, this can minimize the individual differences in surface properties after the fastening. In addition, the frictional force can be stable on the bearing and threaded surfaces in the fastening portion, so that the axial tension can be stable. Accordingly, the variation in axial tension can be reduced among the fastening portions when the same fastening torque is applied to cause the fastening. This allows the upper limit of the variation of the axial tension to be maintained below the bolt yield point. In addition, the fastening can be stable, so that the first and second bearings can be evenly preloaded. These features can result in improving the rotational stability of the eccentric oscillation gear device.

(2) In the eccentric oscillation gear device of the present disclosure as recited in (1), the internally threaded portion may have a hardness less than a Brinell hardness (HB) 353 (corresponding to HRC38).

(3) In the eccentric oscillation gear device of the present disclosure as recited in (1), in the fastening portion, a difference in hardness between the fastener and the internally threaded portion is greater than a Vickers hardness (HV) 62 (corresponding to HRC6).

(4) In the eccentric oscillation gear device of the present disclosure as recited in (1), where MRa (μm) denotes surface roughness of the externally threaded portion after the fastening and the externally and internally threaded portions engage with each other and FRa (μm) denotes surface roughness of the internally threaded portion after the fastening, the surface roughness of the internally threaded portion FRa (μm) is within a range of 0.2 to 1.0, and a ratio RRa=MRa/FRa is within a range of 0.25 to 3.333.

(5) In the eccentric oscillation gear device of the present disclosure as recited in (4), where MRa (μm) denotes the surface roughness of the externally threaded portion after the fastening and the externally and internally threaded portions engage with each other, FRa (μm) denotes the surface roughness of the internally threaded portion after the fastening, and RRa denotes the ratio of MRa/FRa, in an orthogonal coordinate system defined by a horizontal axis representing FRa and a vertical axis representing RRa=MRa/FRa, the surface roughness of the internally threaded portion FRa (μm) and the ratio RRa=MRa/FRa are within a range delineated by
a point RRa1 (0.3, 3.333), a point RRa2 (0.4, 2.500), a point RRa3 (0.5, 2.000), a point RRa4 (0.6, 1.667), a point RRa5 (0.7, 1.429), a point RRa6 (0.8, 1.250), a point RRa7 (0.9, 1.111), a point RRa8 (1.0, 1.000), a point RRa9 (1.0, 0.500), a point RRa10 (0.9, 0.556), a point RRa12 (0.8, 0.250), a point RRa13 (0.7, 0.286), a point RRa14 (0.6, 0.333), a point RRa15 (0.5, 0.400), a point RRa16 (0.4, 0.500), a point RRa17 (0.3, 0.667), a point RRa18 (0.2, 1.000), and a point RRa19 (0.2, 2.500), where numerical values in parentheses following each point respectively denote FRa and RRa.

(6) In the eccentric oscillation gear device of the present disclosure as recited in (1), where MRpk (μm) denotes surface roughness of the externally threaded portion after the fastening and the externally and internally threaded portions engage with each other and FRpk (μm) denotes surface roughness of the internally threaded portion after the fastening, the surface roughness of the internally threaded portion FRpk (μm) is within a range of 0.2 to 0.6, and a ratio RRpk=MRpk/FRpk is within a range of 0.4 to 5.5.

(7) In the eccentric oscillation gear device of the present disclosure as recited in (6), where MRpk (μm) denotes the surface roughness of the externally threaded portion after the fastening and the externally and internally threaded portions engage with each other, FRpk (μm) denotes the surface roughness of the internally threaded portion after the fastening, and RRpk denotes the ratio of MRpk/FRpk, in an orthogonal coordinate system defined by a horizontal axis representing FRpk and a vertical axis representing RRpk=MRpk/FRpk, the surface roughness of the internally threaded portion FRpk (μm) and the ratio RRpk=MRpk/FRpk are within a range delineated by a point RRpk1 (0.2, 5.500), a point RRpk2 (0.3, 3.667), a point RRpk3 (0.4, 2.750), a point RRpk4 (0.5, 2.200), a point RRpk5 (0.6, 1.833), a point RRpk6 (0.6, 1.000), a point RRpk7 (0.5, 0.400), a point RRpk8 (0.4, 0.500), a point RRpk9 (0.3, 0.667), and a point RRpk10 (0.2, 1.000), where numerical values in parentheses following each point respectively denote FRpk and RRpk.

(8) In the eccentric oscillation gear device of the present disclosure as recited in (1), where MRv (μm) denotes surface roughness of the externally threaded portion after the fastening and the externally and internally threaded portions engage with each other and FRv (μm) denotes surface roughness of the internally threaded portion after the fastening, the surface roughness of the internally threaded portion FRv (μm) is within a range of 0.4 to 1.1, and a ratio RRv=MRv/FRv is within a range of 0.364 to 1.833.

(9) In the eccentric oscillation gear device of the present disclosure as recited in (8), where MRv (μm) denotes the surface roughness of the externally threaded portion after the fastening and the externally and internally threaded portions engage with each other, FRv (μm) denotes the surface roughness of the internally threaded portion after the fastening, and RRv denotes the ratio of MRv/FRv, in an orthogonal coordinate system defined by a horizontal axis representing FRv and a vertical axis representing RRv=MRv/FRv, the surface roughness of the internally threaded portion FRv (μm) and the ratio RRv=MRv/FRv are within a range delineated by a point RRv1 (0.4, 1.500), a point RRv2 (0.5, 1.200), a point RRv3 (0.6, 1.833), a point RRv4 (0.7, 1.571), a point RRv5 (0.8, 1.375), a point RRv6 (0.9, 1.222), a point RRv7 (1.0, 1.100), a point RRv8 (1.1, 1.000), a point RRv9 (1.1, 0.364), a point RRv10 (1.0, 0.400), a point RRv11 (0.9, 0.444), a point RRv12 (0.8, 0.500), a point RRv13 (0.7, 0.571), a point RRv14 (0.6, 0.667), a point RRv15 (0.5, 0.800), and a point RRv16 (0.4, 1.000), where numerical values in parentheses following each point respectively denote FRv and RRv.

(10) To solve the problems, an eccentric oscillation gear device of another aspect of the present disclosure includes: a casing; an internal gear provided on an inner circumference of the casing; an external gear meshing with the internal gear; an eccentric body for oscillating the external gear; a first member supported by the casing via a first bearing; a second member supported by the casing via a second bearing; and a fastening portion fastening the first and second members in an axial direction of the casing. The fastening portion includes: an internally threaded portion formed in the first member; and a fastener having an externally threaded portion. The fastener has a Rockwell hardness HRC of 44 or higher, and the internally threaded portion has a lower hardness than the fastener.

According to the above-described configurations, the threads of the externally threaded portion having the above-mentioned hardness can plastically deform the rough surface or micro projections of the threads of the internally threaded portion when the first and second members are fastened. Therefore, in the fastening portion, an increased area of contact can be obtained between the threads of the externally threaded portion and the threads of the internally threaded portion. This can reduce the variation in fastening force. Accordingly, the axial tension between the first and second members can be stabilized. At the same time, since the externally threaded portion has a higher hardness, this can minimize the individual differences in surface properties after the fastening. In addition, the frictional force can be stable on the bearing and threaded surfaces in the fastening portion, so that the axial tension can be stable. Accordingly, the variation in axial tension can be reduced among the fastening portions when the same fastening torque is applied to cause the fastening. This allows the upper limit of the variation of the axial tension to be maintained below the bolt yield point. In addition, the fastening can be stable, so that the first and second bearings can be evenly preloaded. These features can result in improving the rotational stability of the eccentric oscillation gear device.

(11) To solve the problems, a robot of another aspect of the present disclosure includes: a plurality of members movably connected, the plurality of members including an arm, a connecting portion rotatably connecting together the plurality of members including the arm; and an eccentric oscillation gear device attached to the connecting portion. The eccentric oscillation gear device includes: a casing; a first member supported by the casing via a first bearing; a second member supported by the casing via a second bearing; and a fastening portion fastening the first and second members in an axial direction of the casing. The fastening portion includes: an internally threaded portion formed in the first member; and a fastener having an externally threaded portion. The fastener has a Rockwell hardness HRC of 44 or higher, and the internally threaded portion has a lower hardness than the fastener.

According to the above-described configurations, the threads of the externally threaded portion having the above-mentioned hardness can plastically deform the rough surface or micro projections of the threads of the internally threaded portion when the first and second members are fastened. Therefore, in the fastening portion, an increased area of contact can be obtained between the threads of the externally threaded portion and the threads of the internally threaded portion. This can reduce the variation in fastening force. Accordingly, the axial tension between the first and second members can be stabilized. At the same time, since the externally threaded portion has a higher hardness, this can minimize the individual differences in surface properties after the fastening. In addition, the frictional force can be stable on the bearing and threaded surfaces in the fastening portion, so that the axial tension can be stable. Accordingly, the fastening torque of the same magnitude can be applied among the multiple fastening portions when the first and second members are fastened. In this manner, the variation in axial tension can be reduced among the fastening portions when the first and second members are fastened. This allows the upper limit of the variation of the axial tension to be maintained below the bolt yield point. In addition, the fastening can be stable, so that the first and second bearings can be evenly preloaded. These features can result in improving the fastening of the first and second members, which are rotatable relative to each other, thereby improving the rotational stability. Accordingly, the rotational stability of the eccentric oscillation gear device can be improved. Since the axial tension is stabilized, the rigidity of the eccentric oscillation gear device when it is subjected to moments is stabilized. Therefore, the positional and trajectory accuracy of the robot is stabilized at a high level.

(12) To solve the problems, an industrial machine of another aspect of the present disclosure includes: a plurality of members connected to each other, a connecting portion rotatably connecting together the plurality of members; and an eccentric oscillation gear device attached to the connecting portion. The eccentric oscillation gear device includes: a casing; a first member supported by the casing via a first bearing; a second member supported by the casing via a second bearing; and a fastening portion fastening the first and second members in an axial direction of the casing. The fastening portion includes: an internally threaded portion formed in the first member; and a fastener having an externally threaded portion. The fastener has a Rockwell hardness HRC of 44 or higher, and the internally threaded portion has a lower hardness than the fastener.

According to the above-described configurations, the threads of the externally threaded portion having the above-mentioned hardness can plastically deform the rough surface or micro projections of the threads of the internally threaded portion when the first and second members are fastened. Therefore, in the fastening portion, an increased area of contact can be obtained between the threads of the externally threaded portion and the threads of the internally threaded portion. This can reduce the variation in fastening force. Accordingly, the axial tension between the first and second members can be stabilized. At the same time, since the externally threaded portion has a higher hardness, this can minimize the individual differences in surface properties after the fastening. In addition, the frictional force can be stable on the bearing and threaded surfaces in the fastening portion, so that the axial tension can be stable in the fastening portion. Accordingly, the fastening torque of the same magnitude can be applied among the multiple fastening portions when the first and second members are fastened. Accordingly, the variation in axial tension can be reduced among the fastening portions when the first and second members are fastened. This allows the upper limit of the variation of the axial tension to be maintained below the bolt yield point. In addition, the fastening can be stable, so that the first and second bearings can be evenly preloaded. These features can result in improving the fastening of the first and second members, which are rotatable relative to each other, thereby improving the rotational stability. Accordingly, the rotational stability of the eccentric oscillation gear device can be improved. Since the axial tension is stabilized, the rigidity of the eccentric oscillation gear device when it is subjected to moments is stabilized. Therefore, the positional and trajectory accuracy of the industrial machine is stabilized at a high level.

(13) To solve the problems, a method of assembling an eccentric oscillation gear device according to another aspect of the present disclosure is provided. The eccentric oscillation gear device includes: a casing; a first member supported by the casing via a first bearing; a second member supported by the casing via a second bearing; and a fastening portion fastening the first and second members in an axial direction of the casing. The eccentric oscillation gear device is assembled by using the fastening portion to fasten the first and second members so that the first and second bearings are preloaded. The fastening portion includes: an internally threaded portion formed in the first member; and a fastener having an externally threaded portion, and the fastener has a Rockwell hardness HRC of 44 or higher, and the internally threaded portion has a lower hardness than the fastener.

According to the above-described configurations, the threads of the externally threaded portion having the above-mentioned hardness can plastically deform the rough surface or micro projections of the threads of the internally threaded portion when the first and second members are fastened. Therefore, in the fastening portion, an increased area of contact can be obtained between the threads of the externally threaded portion and the threads of the internally threaded portion. This can reduce the variation in fastening force. Accordingly, the axial tension between the first and second members can be stabilized. At the same time, since the externally threaded portion has a higher hardness, this can minimize the individual differences in surface properties after the fastening. In addition, the frictional force can be stable on the bearing and threaded surfaces in the fastening portion, so that the axial tension can be stable. Accordingly, the fastening torque of the same magnitude can be applied among the multiple fastening portions when the first and second members are fastened. Accordingly, the variation in axial tension can be reduced among the fastening portions when the first and second members are fastened. This allows the upper limit of the variation of the axial tension to be maintained below the bolt yield point. In addition, the fastening can be stable, so that the first and second bearings can be evenly preloaded. These features can result in improving the fastening of the first and second members, which are rotatable relative to each other, thereby improving the rotational stability. Accordingly, stable rotation can be achieved in the eccentric oscillation gear device, so that the torque density can be enhanced. Since the axial tension is stabilized, the rigidity of the eccentric oscillation gear device when it is subjected to moments is stabilized. Therefore, the eccentric oscillation gear device can stabilize the service life.

ADVANTAGEOUS EFFECTS

The present disclosure can effectively provide an eccentric oscillation gear device, a robot, an industrial machine and a method of assembling an eccentric oscillation gear device capable of reducing variation in force, stabilizing the axial tension between the hold and the shaft portion, and thus evenly preloading main bearings.

DESCRIPTION OF THE PREFERRED EMBODIMENTS

First Embodiment

Figure 1:
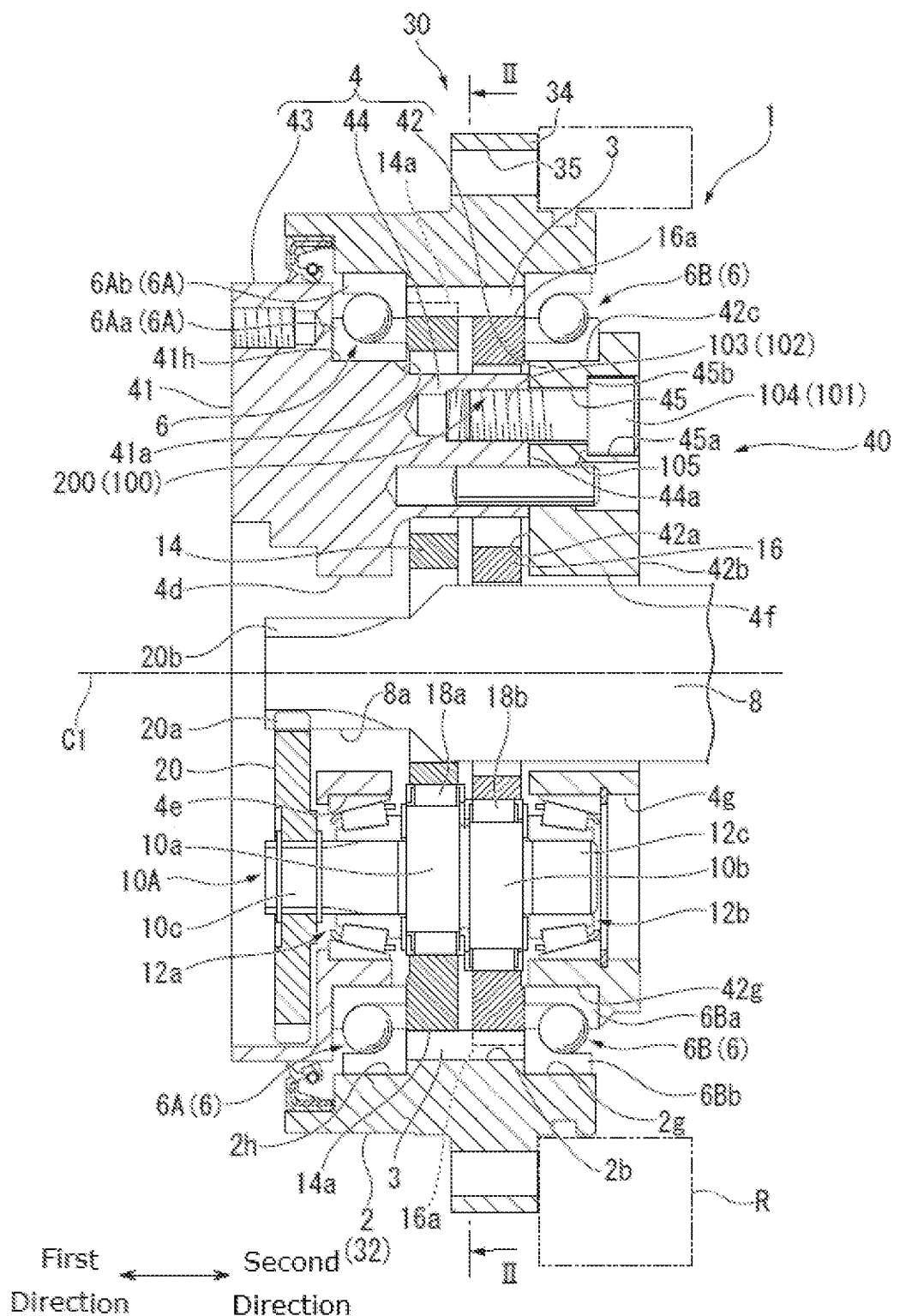
FIG. 1 is a sectional view showing an eccentric oscillation gear device according to a first embodiment of the disclosure.
Figure 2:
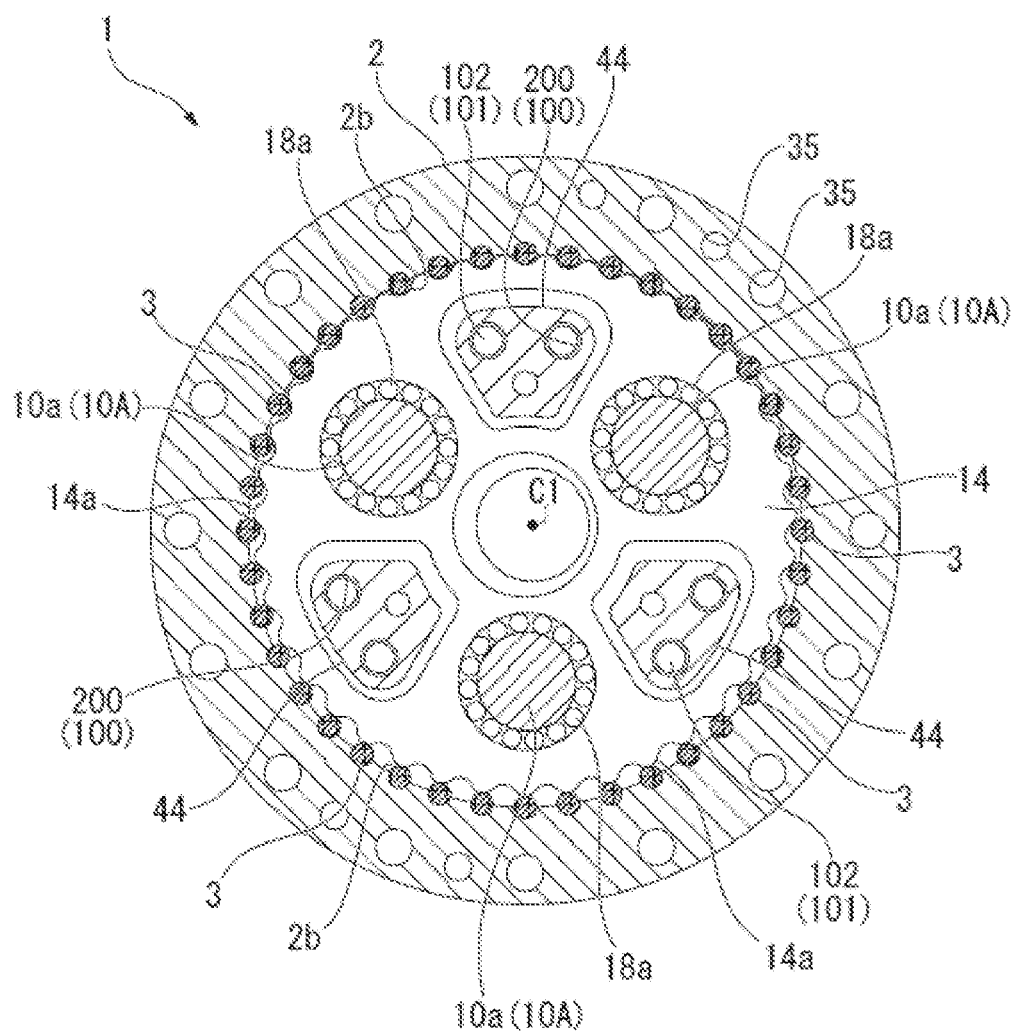
FIG. 2 is a sectional view along a line II-II in FIG. 1.

The following describes an eccentric oscillation gear device according to a first embodiment of the disclosure with reference to the accompanying drawings. FIG. 1 is a sectional view showing the eccentric oscillation gear device according to the embodiment. FIG. 2 is a sectional view along a line II-II in FIG. 1. In FIGS. 1 and 2, the reference sign 1 denotes the eccentric oscillation gear device.

<Eccentric Oscillation Gear Device>

As shown in FIGS. 1 and 2, the eccentric oscillation gear device 1 according to the embodiment is what is called a solid speed reducer (transmission) having a solid input shaft 8. The eccentric oscillation gear device (speed reducer) 1 includes a casing 30 and a speed reduction mechanism 40. The casing 30 includes a body portion 32 and a flange portion 34. The flange portion 34 is shaped such that it extends outward in the radial direction from the body portion 32. In the following description of the first embodiment, the direction along an axis C1 of the body portion 32 is hereunder simply referred to as an axial direction, and the direction orthogonal to the axis C1 as viewed in the axial direction is referred to as a radial direction, and the circumferential direction about the axis C1 is simply referred to as a circumferential direction. The term "input side" refers to the side of the eccentric oscillation gear device 1 connected to a drive source, and the term "output side" refers to the side of the eccentric oscillation gear device 1 connected to a mechanical part such as an arm receiving the output from the eccentric oscillation gear device 1. The drive source is an example of a first member, and the mechanical part such as an arm is an example of a second member. The eccentric oscillation gear device 1 is configured to change the number of rotations at a predetermined ratio and transmit a resulting driving force between the first member and the second member.

The body portion 32 is shaped like a cylinder extending along the axis C1. The body portion 32, which is an example of a first cylinder, is open at the input side in the direction of the axis C1. The opening of the body portion 32 houses the speed reduction mechanism 40 in a rotatable manner. The flange portion 34 is integrated with the body portion 32. The eccentric oscillation gear device 1 has a plurality of (e.g., three) transmission gears 20 exposed to the outside. The eccentric oscillation gear device 1 receives rotation input by a motor via the transmission gears 20.

The flange portion 34 is provided on the outer periphery of the casing 30. The flange portion 34 has through-holes 35 extending through the flange portion 34 in the axial direction. The through-holes 35 are arranged at intervals in the circumferential direction of the flange portion 34. The through-holes 35 are fastening holes penetrated by fastening members such as bolts for fastening the eccentric oscillation gear device 1 to a robot R (described later). Each of the through-holes 35 has an internally threaded portion (not shown) formed therein. The internally threaded portion threadably receives the fastening member. The through-hole 35 and the fastening member constitute a mounting fastening portion (described later).

In the eccentric oscillation gear device 1, as the input shaft 8 corresponding to an input gear 20b is rotated, this causes a crankshaft (eccentric member) 10A to rotate. In the eccentric oscillation gear device 1, as eccentric portions 10a and 10b of the crankshaft 10A rotate, oscillating gears 14 and 16 are resultantly oscillatorily rotated. In this way, the input rotation is decelerated, and the decelerated rotation can be output.

The eccentric oscillation gear device 1 includes an outer tube (casing) 2 corresponding to the body portion 32 (the first cylinder), a carrier 4, which is an example of a second cylinder, the input shaft 8, a plurality of (for example, three) crankshafts 10A, a first oscillating gear 14, a second oscillating gear 16, and the plurality of (for example, three) transmission gears 20.

The outer tube 2 has a substantially cylindrical shape. The outer tube 2 constitutes the outer surface of the eccentric oscillation gear device 1. The outer tube 2 has on the inner circumferential surface thereof a plurality of pin grooves 2b. The pin grooves 2b extend in the axial direction of the outer tube 2. The pin grooves 2b have a semicircular sectional shape when cut along a plane orthogonal to the axial direction. The pin grooves 2b are arranged at regular intervals in the circumferential direction along the inner circumferential surface of the outer tube 2.

The outer tube 2 has a plurality of internal tooth pins (internal teeth) 3. The internal tooth pins 3 are attached in the pin grooves 2b. More specifically, each internal tooth pin 3 is fitted in the corresponding pin groove 2b and retained therein such that it extends in the axial direction of the outer tube 2. In this manner, the plurality of internal tooth pins 3 are arranged at regular intervals along the circumference of the outer tube 2. The internal tooth pins 3 mesh with first external teeth 14a of the first oscillating gear 14 and second external teeth 16a of the second oscillating gear 16.

The carrier 4 and the outer tube 2 are coaxially disposed. The carrier 4 is housed within the outer tube 2. The carrier 4 is rotatable relative to the outer tube 2 (casing 30) about the same axis. More specifically, the carrier 4 is disposed radially inside the outer tube 2. The carrier 4 is further supported by main bearings 6, such that it is rotatable relative to the outer tube 2. The carrier 4 is divided into a first carrier (first member; shaft) 41 and a second carrier (second member; hold) 42 in the direction of the axis C1. The first carrier (first member; shaft) 41 faces a first direction in the direction extending along the axis C1. The second carrier (second member; hold) 42 faces a second direction in the direction extending along the axis C1. The first direction corresponds to the output side mentioned above. The second direction corresponds to the input side mentioned above. The main bearings 6 are ball bearings having spherical rolling elements. The main bearings 6 are spaced apart from each other in the axial direction. The main bearings 6, however, are not limited to those disclosed in the present embodiment. As the main bearings 6, various bearings can be used, such as roller bearings, especially tapered roller bearings having rolling elements substantially shaped like a circular truncated cone, and plain bearings.

The first carrier 41 includes a disk-shaped base plate 43 and a plurality of (e.g., three in the present embodiment) of pillars (shaft portions) 44 protruding toward the second direction from the end of the base plate 43 that faces the second direction. In the embodiment, the base plate 43 and the pillars 44 are integrally molded. A first bearing receiving part 41h is formed in an outer circumferential surface 41a of the first carrier 41. The first bearing receiving part 41h receives an inner race 6Aa of a first bearing (main bearing) 6A fitted thereon. A first bearing receiving part 2h is formed in the inner circumferential surface of the portion of the outer tube 2 (casing 30) near the first direction. The first bearing receiving part 2h receives an outer race 6Ab of the first bearing 6A fitted thereon.

The pillars 44 of the first carrier 41 have a columnar shape extending along the direction of the axis C1. The pillars 44 also have a triangular shape as viewed from the direction of the axis C1. The pillars 44 are positioned, in the circumferential direction, between mounting holes 4e formed in the base plate 43, which will be described below. This means that the pillars 44 are arranged at equal intervals in the circumferential direction on the second direction side of the base plate 43. The diameter of the pitch circle of the pillars 44 is substantially the same as the diameter of the pitch circle of the mounting holes 4e.

The pillars 44 have flat ends 44a. The distal end 44a of each pillar 44 has an internally threaded portion 200, which serves as a fastening portion 100. In the embodiment, two fastening portions 100 are formed in each of the pillars 44. Each pillar 44 may have three or more fastening portions 100. The number of fastening portions 100 is not limited to these examples in the present embodiment. The fastening portions 100 are positioned on the same circle centered on the axis C1. The fastening portions 100 formed in the respective three pillars 44 are positioned on the same circle centered on the axis C1. In other words, the six fastening portions 100 are all positioned on the same circle centered on the axis C1. The pitch circle of the six fastening portions 100 is centered on the axis C1 and has the same diameter.

The internally threaded portions 200 extend from the ends 44a of the pillars 44 toward the first direction. By tightening bolts (fasteners) 101 into the internally threaded portions 200, the first and second carriers 41 and 42 are assembled into a single piece.

The second carrier 42 is shaped like a circular plate. The second carrier 42 has a first end 42a on the first direction side, which abuts against the ends 44a of the pillars 44. In this manner, the second carrier 42 is positioned relative to the first carrier 41. A gap is thus left between the base plate 43 of the first carrier 41 and the second carrier 42. This gap is sized equally to the height of the pillars 44. This gap is surrounded by the casing 30, so that an oscillating gear housing part is formed to house the oscillating gears 14 and 16. A second bearing receiving part 42g is formed in an outer circumferential surface 42c of the second carrier 42. The second bearing receiving part 42g receives an inner race 6Ba of a second bearing (main bearing) 6B fitted thereon. A second bearing receiving part 2g is formed in the inner circumferential surface of the outer tube 2 (casing 30). The second bearing receiving part 2g faces the second direction. An outer race 6Bb of the second bearing 6B is fitted on the second bearing receiving part 2g.

The first end 42a of the second carrier 42 is entirely flat. The second carrier 42 has mating holes 45 penetrating therethrough in the thickness direction of the second carrier 42, which are positioned correspondingly to the internally threaded portions 200. The mating holes 45 respectively receive the bolts (fasteners) 101 inserted from the second direction side of the second carrier 42. The bolts 101 are tightened to the internally threaded portions 200 of the pillars 44. In this way, the first carrier 41 and the second carrier 42 are assembled into a single piece. The bolts 101 and the internally threaded portions 200 constitute the fastening portions 100. The fastening portions 100 will be described below.

When the bolts 101 are tightened into the internally threaded portions 200, shafts 102 of the bolts 101 are fitted in the internally threaded portions 200 of the pillars 44 and the mating holes 45 of the second carrier 42. Accordingly, the shafts 102 of the bolts 101 extend across the first carrier 41 and the second carrier 42.

The second carrier 42 has a second end 42b facing the second direction, which has counterboring parts 45a that are in communication with the mating holes 45. The counterboring parts 45a receive heads 104 of the bolts 101. This reduces the protruding height of the heads 104 of the bolts 101 beyond the second end 42b of the second carrier 42. The counterboring parts 45a have bottom surfaces 45b, which are in contact with bearing surfaces 105 of the heads 104 of the tightened bolts 101.

The input shaft 8 serves as an input part for receiving a driving force input thereto from a driving motor (not shown). The input shaft 8 is inserted into a through-hole in the second carrier (end plate) 42. The input shaft 8 is inserted into a through-hole 4d in the base plate 43. The input shaft 8 is disposed such that its central axis is aligned with the central axes of the outer tube 2 and the carrier 4. The input shaft 8 is rotatable about the axis. An input gear 8a is provided on the outer peripheral surface of the end of the input shaft 8.

In the outer tube 2, the three crankshafts 10A are arranged at regular intervals around the input shaft 8 (see FIG. 2). The crankshafts 10A are each supported by a pair of crank bearings 12a and 12b such that they are rotatable about an axis relative to the carrier 4 (see FIG. 1).

Each crankshaft 10A has a shaft body 12c and eccentric portions 10a and 10b integrated with the shaft body 12c.

One end of each crankshaft 10A has a mating portion 10c. A transmission gear 20 is mounted to the mating portion 10c. The one end of the crankshaft 10A is positioned axially outside the mounting holes 4e formed in the base plate 43. The eccentric oscillation gear device 1 of the embodiment is not limited to the example shown in FIG. 1. For example, the eccentric oscillation gear device may have the crankshafts 10A oriented opposite in the axial direction. In such a case, the mating portions 10c are located axially outside the mounting holes 4g formed in the second carrier (end plate) 42.

The first oscillating gear 14 is disposed in the closed space within the outer tube 2. The first oscillating gear 14 is mounted onto the first eccentric portions 10a of the crankshafts 10A via first roller bearings 18a. As the crankshafts 10A rotate, the first eccentric portions 10a eccentrically rotate. The eccentric rotation results in the first oscillating gear 14 oscillatorily rotating while meshing with the internal tooth pins 3.

The second oscillating gear 16 is disposed in the closed space inside the outer tube 2. The second oscillating gear 16 is mounted onto the second eccentric portions 10b of the crankshafts 10A via second roller bearings 18b. The first and second oscillating gears 14 and 16 are arranged in the axial direction so as to correspond to the first and second eccentric portions 10a and 10b. As the crankshafts 10A rotate, the second eccentric portions 10b eccentrically rotate. The eccentric rotation results in the second oscillating gear 16 oscillatorily rotating while meshing with the internal tooth pins 3.

Each transmission gear 20 transmits the rotation of the input gear 8a to the corresponding one of the crankshafts 10A. Each transmission gear 20 is fitted around the mating portion 10c of the corresponding crankshaft 10A. Each transmission gear 20 is rotatable integrally with the corresponding crankshaft 10A around the same axis as the corresponding crankshaft 10A. Each transmission gear 20 has external teeth 20a meshing with the input gear 8a.

<Fastening Portion>

Each of the fastening portions 100 includes the internally threaded portion 200 and the bolt 101. The bolt 101 includes the shaft 102, an externally threaded portion 103 formed on the shaft 102, and the head 104 formed on a portion of the shaft 102 facing the second direction. The head 104 and the shaft 102 are aligned with the same axis. The head 104 has a larger diameter than the shaft 102. The hardness of the internally threaded portion 200 is lower than that of the bolt 101. The internally threaded portion 200 will be hereinafter described.

Figure 3:
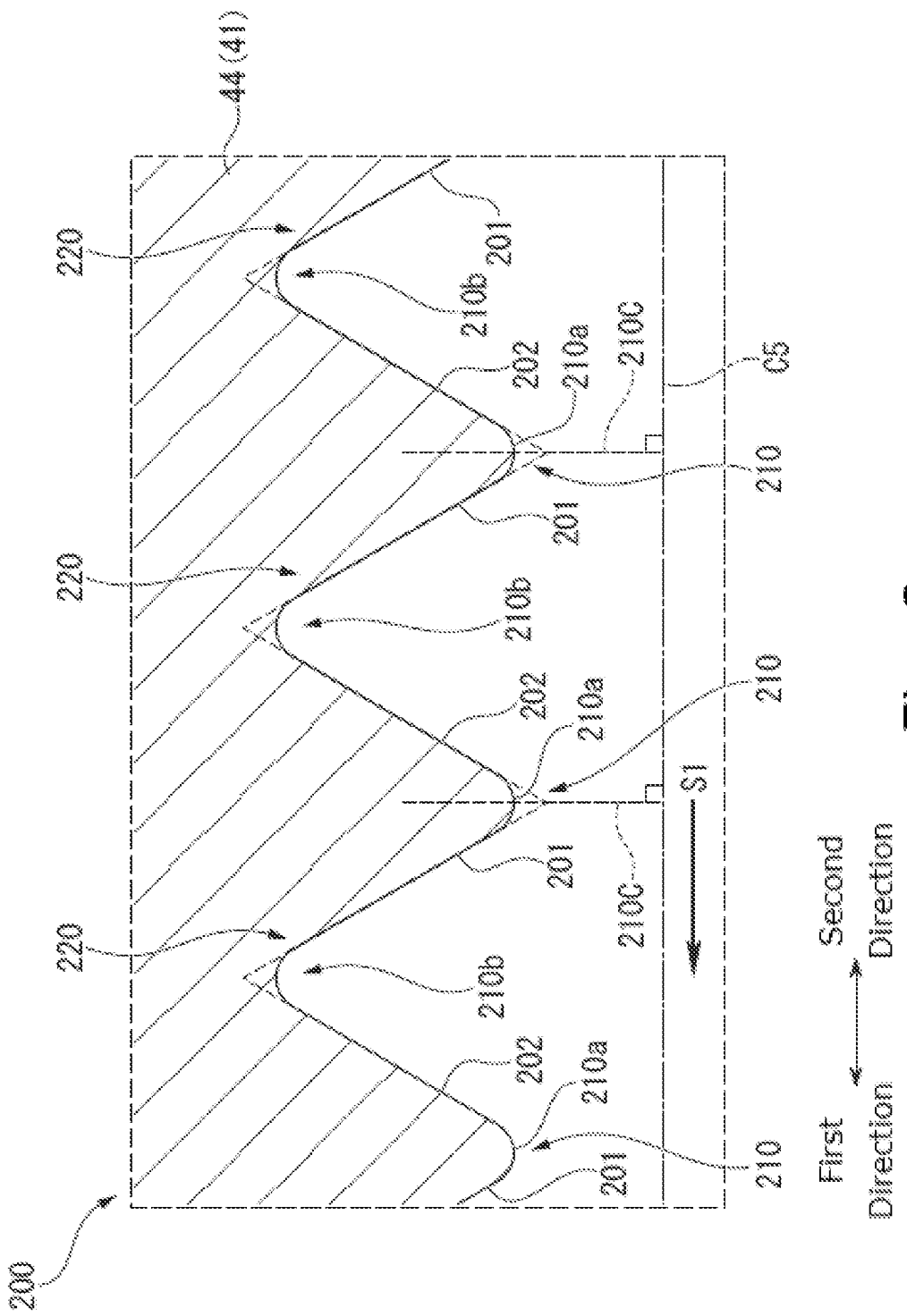
FIG. 3 is a sectional view showing an internally threaded portion of a fastening portion in the eccentric oscillation gear device relating to the first embodiment of the present invention.

FIG. 3 is a sectional view showing the internally threaded portion of the fastening portion in the present embodiment. FIG. 3 also presents the thread axis. In FIG. 3, some of the parts are not shown precisely in terms of their dimensions etc., for the sake of clarity. The internally threaded portion 200 have threads 210, and each of the threads 210 has a pushing flank surface 201, a back flank surface 202, and a root 210b between the pushing and back flank surfaces 201 and 202.

When the bolt 101 is tightened to the internally threaded portion 200, the internally threaded portion 200 and the bolt 101 approach each other along the axis C5 of the internally threaded portion 200 and the bolt 101. This direction is defined as the approaching direction. The approaching direction is a direction along the axis C1 shown in FIG. 1. For the internally threaded portion 200, the second direction, from the left to the right in FIG. 3, is the approaching direction. In FIG. 3, the arrow S1 extending from the right to the left indicates the direction of travel of the bolt 101 during tightening. Therefore, from the perspective of the bolt 101, the approaching direction is the first direction, from the right to the left in FIG. 3. From the perspective of the bolt 101, the approaching direction is the traveling direction S1, from the right to the left in FIG. 3.

The angle of the threads 210 is about 60 degrees. The angle of the threads 210 is not limited to such. The pushing flank surface 201 and the back flank surface 202 of each thread 210 are formed on the upper portion of the thread 210 proximate to a crest 210a of the thread 210. The upper portion of the thread 210 is the portion of the thread 210 that is distal from the root 210b. The upper portion of the thread 210 is the portion of the thread 210 that is proximate to the crest 210a. The upper portion of the thread 210 is the portion of the thread 210 that is proximate to the axis C5 of the internally threaded portion 200.

The pushing flank surface 201 and the back flank surface 202 face each other along the axis C5 with the thread 210 interposed therebetween. On the thread 210, the pushing and back flank surfaces 201 and 202 are opposed each other in the direction extending along the axis C5. The pushing flank surface 201 is formed on the thread 210 to face the first direction. The back flank surface 202 is formed on the thread 210 to face the second direction.

The externally threaded portion 103 of the bolt 101 will be hereinafter described.

Figure 4:
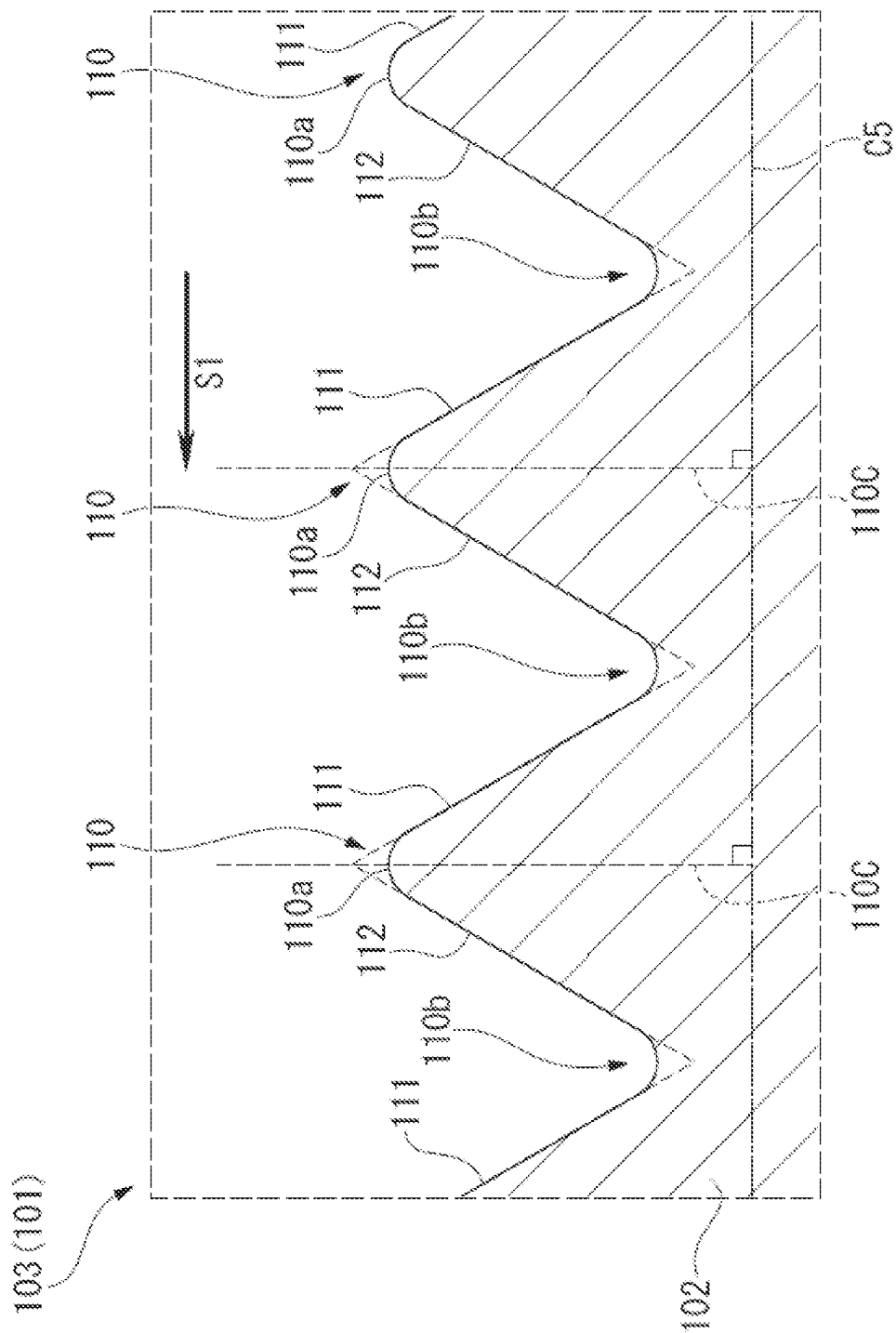
FIG. 4 is a sectional view showing an externally threaded portion of the fastening portion in the eccentric oscillation gear device relating to the first embodiment of the present invention.

FIG. 4 is a sectional view showing the externally threaded portion of the fastening portion in the present embodiment. FIG. 4 also presents the thread axis. In FIG. 4, some of the parts are not shown precisely in terms of dimensions etc., for the sake of clarity. The externally threaded portion 103 has the threads 110, and each thread 110 has a pushing flank surface 111, a back flank surface 112, and a root 110b between the pushing and back flank surfaces 111 and 112.

As described above, from the perspective of the externally threaded portion 103, the first direction from the right to the left is the approaching direction. Therefore, the approaching direction for the externally thread portion 103 corresponds to the approaching direction from the perspective of the bolt 101.

The angle of the threads 110 is about 60 degrees. The pitch of the threads 110 is equivalent to the distance between adjacent ones of the roots 110b in the direction parallel to the axis C5. The upper portion of each thread 110 is the portion of the thread 110 that is distal from the root 110b. The upper portion of the thread 110 is the portion of the thread 110 that is proximate to the crest 110a and proximate to the axis C5 of the externally threaded portion 103.

The pushing flank surface 111 and the back flank surface 112 face each other in the direction along the axis C5 with the thread 110 interposed therebetween. On the thread 110, the pushing and back flank surfaces 111 and 112 are opposed each other in the direction extending along the axis C5. The pushing flank surface 111 is formed on the surface of the thread 110 facing the bearing surface 105 (see FIG. 1). The pushing flank surface 111 is formed on the thread 110 to face the second direction. The back flank surface 112 is formed on the thread 110 to face the first direction.

When the bolt 101 is tightened into the internally threaded portion 200, the pushing flank surface 111 of the thread 110 of the externally threaded portion 103 presses the pushing flank surface 201 of the thread 210 of the internally threaded portion 200. The force from the bolt 101 may act to deform the thread 210 toward the bearing surface 105 of the bolt 101 (the right side of the drawing). As a result, the thread 210 is elastically deformed. Likewise, the force from the internally threaded portion 200 acts to deform the thread 110 toward the traveling direction S1 of the bolt 101 (the left side of the drawing). As a result, the thread 110 is elastically deformed.

In the fastening portion 100, the hardness of the internally threaded portion 200 is lower than the hardness of the externally threaded portion 103. The bolt 101 has a Rockwell hardness (HRC) of 44 or higher. The bolt 101 can have a Rockwell hardness of HRC44 to HRC100. More preferably, the bolt 101 can have a Rockwell hardness of HRC44 to HRC55. Alternatively, the bolt 101 can have a Rockwell hardness of HRC44 to HRC50.

In other words, the bolt 101 has a Brinell hardness (HB) of 409 or higher. Alternatively, the bolt 101 can have a Brinell hardness of HB409 to HB475 (HRC50).

In other words, the bolt 101 has a Vickers hardness (HV) of 434 or higher. Alternatively, the bolt 101 can have a Vickers hardness of HV434 to HV513.

On the other hand, the first carrier (first member; shaft) 41, base plate 43, and shaft portions 44 are composed of the same material. Specifically, the internally threaded portions 200 formed in the shaft portions 44 have a hardness lower than a Brinell hardness (HB) 353 (corresponding to HRC38). In other words, the internally threaded portions 200 have a hardness lower than a Rockwell hardness of HRC38. In other words, the internally threaded portions 200 have a hardness lower than a Vickers hardness of HV372 (corresponding to HRC38).

Furthermore, in the fastening portion 100, the difference in hardness between the bolt 101 and the internally threaded portion 200 is greater than a Vickers hardness HV62 (corresponding to HRC6). In other words, the difference in hardness between the bolt 101 and the internally threaded portion 200 is greater than a Brinell hardness HB56 (corresponding to HRC6). In other words, the difference in hardness between the bolt 101 and the internally threaded portion 200 is greater than a Rockwell hardness HRC6.

When the fastening portion 100 is fastened, a fastening force is applied to bring the threads 210 of the soft internally threaded portion 200 into contact with the threads 110 of the hard externally threaded portion 103. This causes a change in the surface of the threads 210 of the soft internally threaded portion 200. Specifically speaking, as the fastening force is applied, the shape of the pushing flank surfaces 111 of the threads 110 of the hard externally threaded portion 103 is transferred onto the pushing flank surfaces 201 of the threads 210 of the soft internally threaded portion 200. Stated differently, as the fastening force is applied, the pushing flank surfaces 111 crush rough or raised portions of the pushing flank surfaces 201. In other words, as the fastening force is applied, the pushing flank surfaces 111 plastically deform the micro projections, which make the rough pushing flank surfaces 201. This in turn lowers the coefficient of friction on the pushing flank surfaces 201, thereby stabilizing the axial tension. As a result, the surface roughness of the pushing flank surfaces 201 of the threads 210 of the internally threaded portion 200 can fall within the above-mentioned predetermined range. This means that a change in surface roughness of the pushing flank surfaces 201 of the threads 210 of the internally threaded portion 200 can represent the state of the fastening in the fastening portion 100.

In the eccentric oscillation gear device 1 of the embodiment, the first carrier (shaft) 41 and the second carrier (hold) 42 are fastened together in the above-described manner. As a result of the fastening, the threads 110 of the externally threaded portion 103 of the bolt (fastener) 101 come into contact with the threads 210 of the internally threaded portion 200 of the pillar 44. Here, due to the difference in hardness, the shape of the surface of the threads 110 is transferred to the surface of the threads 210. This can contribute to reduce the variation in frictional force, among the plurality of fastening portions 100, at the contact surface between the threads 110 and 210. Therefore, the axial tension between the first carrier 41 and the second carrier 42 can be stabilized. In the eccentric oscillation gear device 1 relating to the present embodiment, the main bearings 6 can be evenly preloaded. In addition, the plurality of fastening portions 100 can achieve the same fastening torque, which can reduce the variation in axial tension among the plurality of fastening portions 100 when the fastening portions 100 are fastened. This allows the upper limit of the variation in axial tension to be maintained below the bolt yield point. As a result, the torque density can be increased, thereby increasing the axial tension.

In addition, the tapered bearings serving as the crank bearings 12a, 12b used for the crankshaft (eccentric member) 10A can also be preloaded evenly. These features can improve the rotational stability of the eccentric oscillation gear device 1 and extend the service life of the eccentric oscillation gear device 1. At the same time, due to the difference in hardness between the threads 110 and 210, the shape of the surface of the threads 110 of the externally threaded portion 103 can be transferred to the threads 210 of the internally threaded portion 200 of the first carrier (shaft) 41. Furthermore, since the difference in hardness between the threads 110 and 210 is determined to fall within the above-mentioned range, this can facilitate the transferring of the surface shape of the threads 110 onto the threads 210. Therefore, in the fastening portion 100, an increased contact area can be obtained between the threads 110 of the externally threaded portion 103 and the threads 210 of the internally threaded portion 200. This can result in stabilizing the axial tension in the fastening portion 100.

The present embodiment can reduce the variation among the plurality of fastening portions 100 in frictional force at the contact surface between the bolt 101 and the first carrier (shaft) 41. This can result in stabilizing the axial tension between the first carrier (shaft) 41 and the second carrier (hold) 42, so that the main bearings 6 can be evenly preloaded. In addition, since the hardness of the internally threaded portion 200 of the second carrier (hold) 42 can be lower than that of the bolt 101, the elastic deformation of the threads 210 of the internally threaded portion 200 can be facilitated. Therefore, it is possible to increase the contact area between the threads 110 of the bolt 101 and the threads 210 provided in the second carrier 42, thereby stabilizing the axial tension.

In the first embodiment described above, the eccentric oscillation gear device 1 may be what is called a hollow speed reducer (transmission) in which the rotating shaft that serves as the input portion has a hollow structure.

In the first embodiment described above, each of the three pillars 44 has two fastening portions 100 formed therein, but this configuration is not limitative. The number of fastening portions 100 may be changed as desired, as long as the fastening portions 100 on all of the pillars 44 are located on the same circle centered on the axis C1 and the fastening portions 100 on each of the pillars 44 are symmetrically positioned.

For example, each of the three pillars 44 may have three fastening portions 100 formed therein. In this case, in addition to the two fastening portions 100 shown in FIG. 2, the third fastening portion 100 can be located equidistant from the two fastening portions 100 and on a circle centered on the axis C1 and smaller than the circle for the two fastening portions 100.

It is also possible that each of the three pillars 44 has one fastening portion 100 formed therein.

Further, the internally threaded portion 200 of the fastening portion 100 can have the above-described features. The bolt 101 can be configured as in the conventional art. Alternatively, in the fastening portion 100, while the externally threaded portion 103 is configured as described above, the internally threaded portion 200 can be configured as in the conventional art. Furthermore, the respective features of the fastening portion 100 can be combined in various manners.

Second Embodiment

Figure 5:
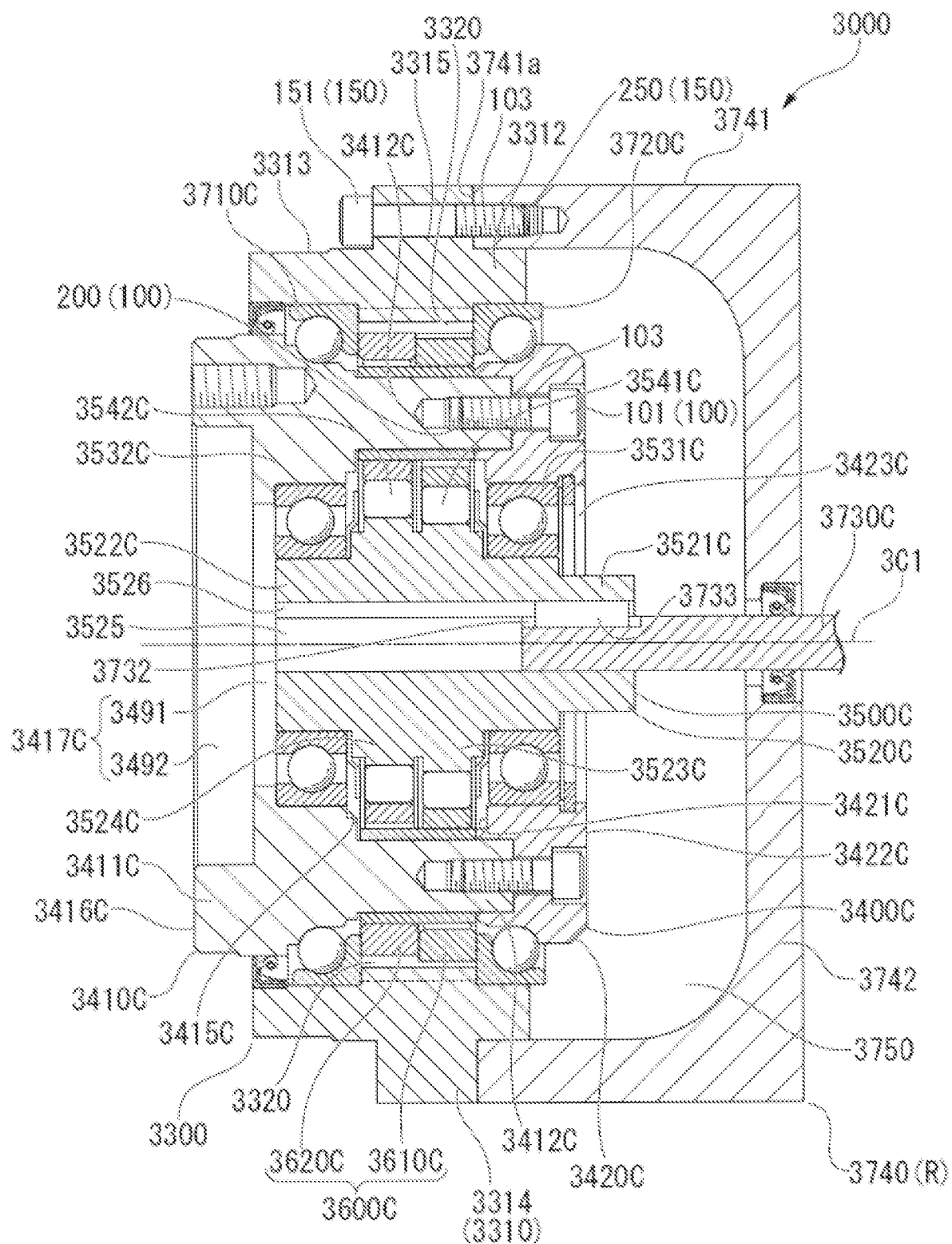
FIG. 5 is a sectional view showing an eccentric oscillation gear device relating to a second embodiment of the present invention.

The following describes an eccentric oscillation gear device according to a second embodiment of the disclosure with reference to the accompanying drawings. FIG. 5 is a sectional view showing the eccentric oscillation gear device according to the embodiment. The present embodiment is different from the above-described first embodiment in terms of the crankshafts. In FIG. 5, the reference sign 3000 denotes the eccentric oscillation gear device.

The eccentric oscillation gear device (speed reducer) 3000 of the embodiment is of what is called a center crank type. The eccentric oscillation gear device 3000 of the embodiment includes an outer tube 3300 and an outer wall 3740, as shown in FIG. 5. The eccentric oscillation gear device 3000 includes a carrier 3400C, a crankshaft assembly 3500C, a gear unit 3600C, two main bearings 3710C and 3720C, and an input gear 3730C.

The output axis 3C1 shown in FIG. 5 corresponds to a central axis (axis) of the two main bearings 3710C and 3720C and the input gear 3730C. The outer tube 3300 and the carrier 3400C are relatively rotatable about the output axis 3C1.

The driving force generated by a motor (not shown) or any other drive source (not shown) is inputted to the crankshaft assembly 3500C through the input gear 3730C extending along the output axis 3C1. The driving force inputted to the crankshaft assembly 3500C is transmitted to the gear unit 3600C disposed in an internal space surrounded by the outer tube 3300 and the carrier 3400C. The two main bearings 3710C and 3720C are fitted into an annular space formed between the outer tube 3300 and the carrier 3400C surrounded by the outer tube 3300. The outer tube 3300 or the carrier 3400C is rotatable about the output axis 3C1 by the driving force transmitted to the gear unit 3600C.

The carrier 3400C includes a base (first carrier) 3410C and an end plate (second carrier) 3420C. The carrier 3400C as a whole is shaped like a cylinder. The end plate 3420C has a substantially disc-like shape. The outer circumferential surface of the end plate 3420C is partially surrounded by a second cylindrical portion 3312. The main bearing 3720C is fitted into a ring-shaped interstice between the second cylindrical portion 3312 and the circumferential surface of the end plate 3420C. The outer circumferential surface of the end plate 3420C is formed such that the rollers of the main bearing 3720C can roll directly on the end plate 3420C.

The base 3410C includes a base plate portion 3411C and a plurality of shaft portions 3412C. The outer circumferential surface of the base plate portion 3411C is partially surrounded by a third cylindrical portion 3313. The main bearing 3710C may be fitted into a ring-shaped interstice between the third cylindrical portion 3313 and the outer circumferential surface of the base plate portion 3411C. The outer circumferential surface of the base plate portion 3411C is formed such that the rollers of the main bearing 3710C can roll directly on the outer circumferential surface of the base plate portion 3411C. In the direction in which the output axis 3C1 extends, the base plate portion 3411C is separated from the end plate 3420C. The base plate portion 3411C is substantially coaxial with the end plate 3420C. That is, the output axis 3C1 corresponds to the central axis of the base plate portion 3411C and the end plate 3420C.

The base plate portion 3411C includes an inner surface 3415C and an outer surface 3416C on the opposite side to the inner surface 3415C. The inner surface 3415C faces the gear unit 3600C. The inner surface 3415C and the outer surface 3416C extend along an imaginary plane (not shown) orthogonal to the output axis 3C1. A central through hole 3417C is formed through the base plate portion 3411C. The central through hole 3417C extends between the inner surface 3415C and the outer surface 3416C along the output axis 3C1. The output axis 3C1 corresponds to the central axis of the central through hole 3417C.

The end plate 3420C includes an inner surface 3421C and an outer surface 3422C on the opposite side to the inner surface 3421C. The inner surface 3421C faces the gear unit 3600C. The inner surface 3421C and the outer surface 3422C extend along an imaginary plane (not shown) orthogonal to the output axis 3C1. A central through hole 3423C is formed through the end plate 3420C. The central through hole 3423C extends between the inner surface 3421C and the outer surface 3422C along the output axis 3C1. The output axis 3C1 corresponds to the central axis of the central through hole 3423C.

The shaft portions 3412C extend from the inner surface 3415C of the base plate portion 3411C toward the inner surface 3421C of the end plate 3420C. The end plate 3420C is connected to the end surfaces of the shaft portions 3412C. The end plate 3420C may be connected to the end surface of each shaft portion 3412C by a fastening portion 100, which is constituted by a bolt 101 and an internally threaded portion 200, a positioning pin and the like.

<Fastening Portion>

Since the fastening portion 100 has the same configuration as in the first embodiment shown in FIGS. 3 and 4, the fastening portion 100 is provided with the same reference signs as in the first embodiment shown in FIGS. 3 and 4, and the description thereof is omitted.

The gear unit 3600C is disposed between the inner surface 3415C of the base plate portion 3411C and the inner surface 3421C of the end plate 3420C. The shaft portions 3412C extend through the gear unit 3600C and are connected to the end plate 3420C. The gear unit 3600C includes two oscillating gears 3610C and 3620C. The oscillating gear 3610C is disposed between the end plate 3420C and the oscillating gear 3620C. The oscillating gear 3620C is disposed between the base plate portion 3411C and the oscillating gear 3610C. The oscillating gears 3610C and 3620C may be formed based on a common design drawing. Each of the oscillating gears 3610C and 3620C may be a trochoidal or cycloidal gear. The principle of this embodiment is not limited to a particular type of gears used as the oscillating gears 3610C, 3620C.

Each of the oscillating gears 3610C and 3620C is meshed with a plurality of internal tooth pins 3320. When the crankshaft assembly 3500C rotates about the output axis 3C1, the oscillating gears 3610C and 3620C perform circling movement within a case 3310 while being meshed with the internal tooth pins 3320 (namely, oscillatorily rotate). During this movement, the respective centers of the oscillating gears 3610C and 3620C circle about the output axis 3C1. Relative rotation between the outer tube 3300 and the carrier 3400C is caused by the oscillatory rotation of the oscillating gears 3610C and 3620C.

Each of the oscillating gears 3610C and 3620C has a through hole formed at the center. The crankshaft assembly 3500C is fitted into the through holes formed at the respective centers of the oscillating gears 3610C and 3620C. Each of the oscillating gears 3610C and 3620C has a plurality of through holes formed so as to correspond to the plurality of shaft portions 3412C disposed along an imaginary circle centered on the output axis 3C1. The plurality of shaft portions 3412C are inserted into these through holes, respectively. These through holes have such a size that no interference occurs between the plurality of shaft portions 3412C and the oscillating gears 3610C and 3620C.

The crankshaft assembly 3500C includes a crankshaft 3520C, two journal bearings 3531C, 3532C, and two crank bearings 3541C, 3542C. The crankshaft 3520C includes a first journal 3521C, a second journal 3522C, a first eccentric portion 3523C, and a second eccentric portion 3524C. The first journal 3521C extends along the output axis 3C1 and is inserted into the central through hole 3423C of the end plate 3420C. The second journal 3522C, which is disposed on the opposite side to the first journal 3521C, extends along the output axis 3C1 and is inserted into the central through hole 3417C of the base plate portion 3411C.

The journal bearing 3531C is fitted into an annular space between the first journal 3521C and the inner wall of the central through hole 3423C formed in the end plate 3420C. As a result, the first journal 3521C is joined to the end plate 3420C. The journal bearing 3532C is fitted into an annular space between the second journal 3522C and the inner wall of the central through hole 3417C formed in the base plate portion 3411C. As a result, the second journal 3522C is joined to the base plate portion 3411C. In this manner, the carrier 3400C can support the crankshaft assembly 3500C. In this embodiment, the end plate 3420C is an example of a first end wall. The base plate portion 3411C is an example of a second end plate.

The first eccentric portion 3523C is positioned between the first journal 3521C and the second eccentric portion 3524C. The second eccentric portion 3524C is positioned between the second journal 3522C and the first eccentric portion 3523C. The crank bearing 3541C is fitted into the through hole formed at the center of the oscillating gear 3610C and is joined to the first eccentric portion 3523C. As a result, the oscillating gear 3610C is mounted to the first eccentric portion 3523C. The crank bearing 3542C is fitted into the through hole formed at the center of the oscillating gear 3620C and is joined to the second eccentric portion 3524C. As a result, the oscillating gear 3620C is mounted to the second eccentric portion 3524C.

The first journal 3521C is substantially coaxial with the second journal 3522C and rotates about the output axis 3C1. Each of the first and second eccentric portions 3523C and 3524C is formed in a columnar shape and positioned eccentrically from the output axis 3C1. The first and second eccentric portions 3523C and 3524C eccentrically rotate with respect to the output axis 3C1 and impart oscillatory rotation to the oscillating gears 3610C and 3620C, respectively. In this embodiment, one of the first and second eccentric portions 3523C and 3524C is an example of an eccentric portion.

When the outer tube 3300 is fixed, the oscillating gears 3610C and 3620C are meshed with the internal tooth pins 3320 of the outer tube 3300. Therefore, the oscillatory rotation of the oscillating gears 3610C, 3620C is converted into the circling movement of the crankshaft 3520C and the rotation of the base plate portion 3411C about the output axis 3C1. The end plate 3420C and the base plate portion 3411C are joined to the first journal 3521C and the second journal 3522C, respectively. Therefore, the circling movement of the crankshaft 3520C is converted into rotary movement of the end plate 3420C and the base plate portion 3411C about the output axis 3C1. The phase difference in the circling movement between the oscillating gears 3610C and 3620C is determined by a difference in eccentricity direction between the first eccentric portion 3523C and the second eccentric portion 3524C.

On the other hand, when the carrier 3400C is fixed, the oscillating gears 3610C, 3620C are meshed with the internal tooth pins 3320 of the outer tube 3300. Therefore, the oscillatory rotation of the oscillating gears 3610C, 3620C is converted into the rotary movement of the outer tube 3300 about the output axis 3C1. The input gear 3730C extends along the output axis 3C1 through a support wall 3742. The input gear 3730C extends through a space 3750 surrounded by the outer wall 3740. The crankshaft 3520C has a through hole 3525 extending along the output axis 3C1. The tip end portion of the input gear 3730C is inserted into the through hole 3525.

A key groove 3732 is formed at the tip end portion of the input gear 3730C. Another key groove 3526 is formed on the inner wall surface of the through hole 3525 formed in the crankshaft 3520C. The key grooves 3732 and 3526 extend substantially parallel to the output axis 3C1. A key 3733 is inserted into the key grooves 3732 and 3526. As a result, the input gear 3730C is joined to the crankshaft 3520C. When the input gear 3730C rotates about the output axis 3C1, the crankshaft 3520C rotates about the output axis 3C1. This causes the oscillating gears 3610C and 3620C to oscillatorily rotate.

The central through hole 3417C formed through the base plate portion 3411C includes a first hollow portion 3491 and a second hollow portion 3492. The first and second hollow portions 3491 and 3492 both have a circular cross section. The first hollow portion 3491 is smaller in cross section than the second hollow portion 3492. The second journal 3522C and the journal bearing 3532C are disposed in the first hollow portion 3491. The outer surface 3416C of the base plate portion 3411C is pressed against a mating member (not shown).

A flange portion 3314 is formed all around the periphery of the case 3310 and is connected to the outer wall 3740. The outer wall 3740 has an outer tube wall 3741. The outer tube wall 3741 has a flat end 3741a. The end 3741a of the outer tube wall 3741 has internally threaded portions 250, which serve as mounting-fastening portions 150. The flange portion 3314 is disposed on the outer periphery of the case 3310 and has through holes 3315 extending through the flange portion 3314 in the direction along the axis 3C1. The through holes 3315 are arranged at intervals in the circumferential direction. The through holes 3315 are fastening holes penetrated by bolts 151 for fastening the eccentric oscillation gear device 3000 to the outer wall 3740 that forms a part of the robot R. The through holes 3315 are penetrated by the bolts 151, which serve as fastening members. The internally threaded portions 250 of the outer wall 3740 and the bolts 151 constitute the mounting-fastening portions 150.

<Mounting-Fastening Portion>

The mounting-fastening portions 150 are configured similarly to the fastening portions 100 relating to the first embodiment shown in FIGS. 3 and 4. The bolts 151 and the internally threaded portions 250 in the mounting-fastening portions 150 correspond to the bolts 101 and the internally threaded portions 200 in the fastening portions 100 in the first embodiment shown in FIGS. 3 and 4. In FIG. 5, these members are denoted by the reference signs 150, 151, and 250, and the other members are denoted by the same reference signs as in the fastening portion 100 in the first embodiment shown in FIGS. 3 and 4 and are not described here.

In the mounting-fastening portion 150, the difference in hardness between the externally threaded portion 103 and the internally threaded portion 250 results in deformation of the threads 110 and 210, as in the fastening portion 100 in the first embodiment shown in FIGS. 3 and 4. In this manner, when the eccentric oscillation gear device 3000 is fastened onto the outer wall 3740 forming a part of the robot R, an increased area of contact can be achieved between the externally and internally threaded portions 103 and 250 of the mounting-fastening portion 150, so that the variation in frictional force can be reduced.

In the present embodiment, the shaft portions 3412C are fastened to the end plate 3420C, as in the above-described embodiment. This can establish a contact between (i) the threads 110 of the externally threaded portions 103 of the bolts (fasteners) 101 and (ii) the threads 210 of the internally threaded portions 200 of the shaft portions 3412C. Here, due to the difference in hardness between the externally threaded portions 103 and the internally threaded portions 200, the shape of the surface of the externally threaded portions 103 is transferred to the internally threaded portions 200. This can contribute to reduce the variation, among the fastening portions 100, in the frictional force at the contact surface between the threads 110 and 210. Therefore, the axial tension between the shaft portions 3412C and the end plate 3420C can be stabilized. As a result, the main bearings 3710C and 3720C can be evenly preloaded.

In addition, the first and second journals 3521C and 3522C used for the crankshaft assembly 3500C can also be preloaded evenly. This can improve the rotational stability of the eccentric oscillation gear device 3000 and increase the torque density. This can also improve the torque density of the eccentric oscillation gear device 3000. At the same time, due to the difference in hardness between the threads 110 and 210, the shape of the surface of the externally threaded portions 103 can be transferred to the threads 210 of the internally threaded portions 200 of the shaft portions 3412C, and this transferring of the shape can be facilitated. Therefore, in the fastening portions 100, an increased contact area can be obtained between the threads 110 of the externally threaded portions 103 and the threads 210 of the internally threaded portions 200, so that the axial tension is stabilized.

Among the fastening portions 100, the variation in frictional force at the contact surface between the bolts 101 and the shaft portions 3412C is reduced, so that the axial tension between the shaft portions 3412C and the end plate 3420C can be stabilized. As a result, the main bearings 3710C and 3720C can be evenly preloaded. In addition, since the hardness of the internally threaded portions 200 of the shaft portions 3412C is lower than that of the bolts 101, this can accelerate the elastic deformation of the threads 210 of the internally threaded portions 200 caused by the threads 110 of the externally threaded portions 103. Therefore, the contact area can be increased between the threads 110 of the bolts 101 and the threads 210 provided in the shaft portions 3412C, thereby stabilizing the axial tension.

In the present embodiment, the fastening portions 100 and the mounting-fastening portions 150 are configured to stabilize the axial tension of the shaft portions 3412C. Therefore, the mounting-fastening portions 150 contribute to stabilize the rigidity of the eccentric oscillation gear device 3000 when it is subjected to moments, so that the positional and trajectory accuracy of the robot R is stabilized at a high level.

This embodiment can produce the same effects as the embodiment described above.

Third Embodiment

Figure 6:
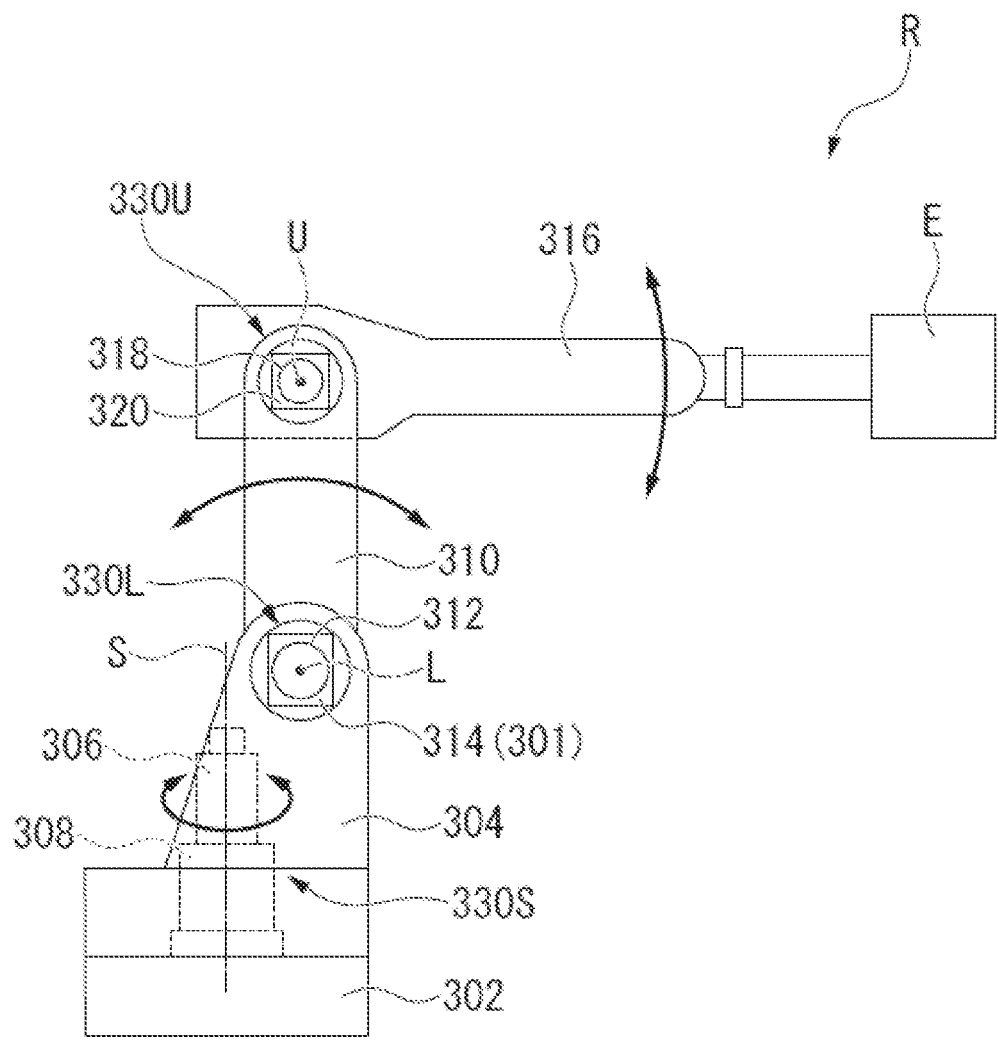
FIG. 6 is a sectional view showing a robot relating to a third embodiment of the present invention.

The following describes an industrial robot relating to a third embodiment of the disclosure with reference to the accompanying drawings. FIG. 6 schematically illustrates the robot relating to the third embodiment. This embodiment is different from the above-described first and second embodiments in terms of the robot to which the eccentric oscillation gear device can be mounted. The other constituents, which correspond to those in the first and second embodiments, are denoted by the same reference signs and are not described here.

<Robot (Mating Member)>

The robot R relating to the present disclosure is preferably an industrial robot, more preferably, a cooperation robot. In the field of factory automation (FA) and the like, a cooperation robot refers to "a robot cooperating with workers." The robot R may be an articulated robot having a plurality of speed reducers (transmissions), each of which corresponds to the eccentric oscillation gear device 1 or the eccentric oscillation gear device 3000.

<Eccentric Oscillation Gear Device>

The eccentric oscillation gear device 1 or 3000 is provided at coupling portions 330L, 330U, and 330S between arms that are rotatably coupled (joint portions of the robot R). The eccentric oscillation gear device 1 or 3000 decelerates a motor torque inputted thereto from a motor serving as a drive source (not shown) and outputs the decelerated torque. The configuration of the eccentric oscillation gear device 1 or 3000 described above is not limitative. The eccentric oscillation gear device 1 or 3000 may have any configuration as long as it can change the speed of the rotation of the drive source that is configured to generate a rotational force. For example, the eccentric oscillation gear device 1 or 3000 may be replaced with a speed-increasing gear for accelerating the rotation of the drive source that is configured to generate a rotational force and outputting the accelerated rotation. Therefore, in the embodiment, the eccentric oscillation gear device is also referred to as a transmission.

The robot R includes a plurality of transmissions (a first transmission 308, a second transmission 314, and a third transmission 320) provided at the coupling portions 330S, 330L, 330U, respectively. These transmissions 308, 314 and 320 each have the fastening portions 100. These transmissions 308, 314 and 320 are each mounted by the mounting-fastening portions 150. The transmissions 308, 314 and 320 each corresponding to the eccentric oscillation gear device 1 or 3000 form a part of the robot R.

The robot R includes: a fixed base 302 contacting with an installation surface; a rotating head 304 extending upward from the fixed base 302; a plurality of arms (a first arm 310 and a second arm 316) rotatably assembled to the rotating head 304, an end effector E provided on the distal end of the arms; and a plurality of transmissions (a first transmission 308, a second transmission 314, and a third transmission 320). The first arm 310 is rotatably coupled to the rotating head 304 via the plurality of transmissions 308, 314 and 320. The second arm 316 is rotatably coupled to the first arm 310 via the transmission 320. Each of the transmissions 308, 314 and 320 may be any one of the eccentric oscillation gear devices 1 and 3000 described above, or may be any combination of the eccentric oscillation gear devices 1 and 3000. The following gives the details.

The rotating head 304 is assembled onto the fixed base 302 so as to be rotatable about S axis. The rotating head 304 rotates about S axis via a first servo motor 306 as a drive source and the first transmission 308. The first arm 310 is assembled to the upper portion of the rotating head 304 so as to be swingable in the front-rear direction about L axis. The first arm 310 swings in the front-rear direction about L axis via a second servo motor 312 as a drive source and the second transmission 314. The second arm 316 is assembled to the upper portion of the first arm 310 so as to be swingable in the top-bottom direction about U axis. The second arm 316 swings in the top-bottom direction about U axis via a third servo motor 318 as a drive source and the third transmission 320. With this configuration, the end effector E can be driven three-dimensionally.

In this embodiment, the fastening portions 100 are configured to stabilize the axial tension of the shaft portions 44, 3412C. In addition, the eccentric oscillation gear devices 1, 3000 have the mounting-fastening portions 150, which are configured to stabilize the rigidity of the eccentric oscillation gear devices 1, 3000 when they are subjected to moments. Therefore, the positional and trajectory accuracy of the robot R is further stabilized at a high level.

In this embodiment, the robot R includes the coupling portions 330L and 330U to which the eccentric oscillation gear devices 1 and 3000 are mounted. The present embodiment, however, is not limited to the robot R. For example, the eccentric oscillation gear devices 1 and 3000 may be mounted to a given industrial machine.

In this case, the main bearings 6, 3710C, 3720C can be similarly preloaded evenly, so that the probability is increased that the industrial machine will fulfill its rated service life. The axial tension is stabilized in the mounting-fastening portions 150 between the industrial machine and the eccentric oscillation gear devices 1, 3000, so that the probability is increased that the industrial machine will fulfill its rated service life.

Examples of the industrial machine in this embodiment include a positioner and an automatic guided vehicle (AGV).

In the above-described embodiments, the fastening portions 100 and the mounting-fastening portions 150 are applied to, for example, the eccentric oscillating gear devices 1 and 3000. The fastening portions 100 and the mounting-fastening portions 150, however, may be applied to differently configured eccentric oscillating gear devices. For example, the fastening portions 100 and the mounting-fastening portions 150 can be applied to eccentric oscillation gear devices using planetary gears.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

The fastening portions relating to the present disclosure have internally threaded portions and externally threaded portions forming part of bolts and having a higher hardness than the internally threaded portions. With such configurations, when the fastening portions are fastened, the externally threaded portions plastically deform the surface of the threads of the internally threaded portions. This results in increasing the area of contact between the internally threaded portions and the externally threaded portions. Accordingly, the multiple fastening portions can produce uniform tightening forces or frictional forces. As a result, an improved axial tension can be achieved in the multiple fastening portions of the eccentric oscillation gear device when it is fastened.

If the difference in hardness is small between the internally threaded portion and the externally threaded portion, it is difficult to control the multiple fastening portions to produce uniform axial tension since the surface friction experienced by the internally threaded portion is affected by the processing accuracy of the internally threaded portion. In the eccentric oscillation gear device relating to the present disclosure, in contrast, the difference in hardness is large between the internally threaded portions and the externally threaded portions. Accordingly, an increased area of contact can be established between the internally threaded portions and the externally threaded portions. As a result, the axial tension can be improved.

The inventor(s) of the present application contemplated how the axial tension is improved in the fastening portions and has concluded as follows.

The area of contact between the internally threaded portions and the externally threaded portions is increased since the threads of the soft internally threaded portions are plastically deformed when the bolts are fastened as if the threads of the soft internally threaded portions conform to the threads of the hard externally threaded portions. The plastic deformation of the internally threaded portions conforming to the externally threaded portions takes place at the surface of the threads that are in contact with each other. In other words, when the bolts are tightened into the internally threaded portions, the surface of the threads of the soft internally threaded portions is plastically deformed as if it conforms to the surface of the threads of the hard externally threaded portions.

As the bolts are fastened, the fastening force is applied. As a result, the micro-shapes on the surface of the threads of the internally threaded portions become more similar to the micro-shapes on the surface of the threads of the externally threaded portions. In other words, due to the difference in hardness between the internally threaded portions and the externally threaded portions, the surface roughness of the internally threaded portions becomes more similar to the surface roughness of the externally threaded portions when the internally and externally threaded portions are fastened with the surfaces of their threads being in contact with each other.

A case is assumed where the roughness of the surface of the threads of the internally threaded portions is less than the roughness of the surface of the threads of the externally threaded portions before they are fastened. Due to the difference in hardness between the internally threaded portions and the externally threaded portions, the surface roughness of the threads of the internally threaded portions becomes more similar to the surface roughness of the threads of the hard externally threaded portions after the fastening than before the fastening. Specifically, the roughness of the surface of the threads of the internally threaded portions is less than the roughness of the surface of the threads of the externally threaded portions before the fastening, but becomes more similar to the roughness of the surface of the threads of the externally threaded portions after the fastening. In this case, the fastening increases the roughness of the surface of the threads of the internally threaded portions. For example, before the fastening, the internally threaded portions may have hardness of HCR38 and surface roughness Ra of 0.3 to 0.5 (μm), and the externally threaded portions may have hardness of HCR44 and surface roughness Ra of 0.5 to 1.0 (μm). In this case, the internally threaded portions have surface roughness Ra of 0.3 to 1.0 (μm) after the fastening.

A case is assumed where the roughness of the surface of the threads of the internally threaded portions is substantially the same as the roughness of the surface of the threads of the externally threaded portions before the fastening. Due to the difference in hardness between the internally threaded portions and the externally threaded portions, the surface roughness of the threads of the internally threaded portions becomes more similar to the surface roughness of the threads of the hard externally threaded portions after the fastening than before the fastening. Specifically, the roughness of the surface of the threads of the internally threaded portions is substantially the same as the roughness of the surface of the threads of the externally threaded portions before the fastening but becomes more similar to the roughness of the surface of the threads of the externally threaded portions after the fastening. In this case, the fastening hardly changes the roughness of the surface of the threads of the internally threaded portions. For example, before the fastening, the internally threaded portions may have hardness of HCR38 and surface roughness Ra of 0.3 to 0.5 (μm), and the externally threaded portions may have hardness of HCR44 and surface roughness Ra of 0.3 to 0.5 (μm). In this case, the internally threaded portions have surface roughness of Ra of 0.3 to 0.5 (μm) after the fastening.

A case is assumed where the roughness of the surface of the threads of the internally threaded portions is greater than the roughness of the surface of the threads of the externally threaded portions before the fastening. Due to the difference in hardness between the internally threaded portions and the externally threaded portions, the surface roughness of the threads of the internally threaded portions becomes more similar to the surface roughness of the threads of the hard externally threaded portions after the fastening than before the fastening. Specifically, the roughness of the surface of the threads of the internally threaded portions is greater than the roughness of the surface of the threads of the externally threaded portions before the fastening, but becomes more similar to the roughness of the surface of the threads of the externally threaded portion after the fastening. In this case, the fastening decreases the roughness of the surface of the threads of the internally threaded portions. For example, before the fastening, the internally threaded portions may have hardness of HCR38 and surface roughness Ra of 0.5 to 1.0 (μm), and the externally threaded portions may have hardness of HCR44 and surface roughness Ra of 0.2 to 0.5 (μm). In this case, the internally threaded portions have surface roughness Ra of 0.2 to 0.8 (μm) after the fastening.

As described above, the surface of the internally threaded portions becomes more similar to the surface of the externally threaded portions, regardless of how much the surface roughness of the internally threaded portions changes. In this way, the area of contact between the threads in the fastening portion becomes larger, thereby improving the axial tension. As mentioned above, the surface roughness of the internally threaded portions after the fastening will depend on the surface roughness of the externally threaded portions.

When a screw is fastened, it is usually preferred that the surface roughness of the contact surface is low in the fastening portion from the perspective of enhancement of the axial tension. According to the present invention, in contrast, the axial tension can be improved regardless of the numerical value of the surface roughness at the contact surface in the fastening portions, in particular, the numerical value of the surface roughness of the internally threaded portions, as described above.

The axial tension is calculated as follows.

Axial tension=fastening torque/(friction on threaded surface+friction on bearing surface+elastic deformation)

The axial tension depends on the coefficient of friction, as well as on the fastening torque. Here, as the coefficient of friction increases, the axial tension decreases. Therefore, variation in coefficient of friction among the multiple fastening portions results in unstable axial tension.

According to the present invention, there is a difference in hardness between the bolts and the internally threaded portions. Having this feature, the internally threaded portions can become more similar to the externally threaded portions regardless of the surface roughness of the internally threaded portions. In other words, the surface roughness of the internally threaded portions can become more similar to the surface roughness of the externally threaded portions. Even if the same fastening torque is applied, a more stable axial tension can be produced in the fastening portions relating to the present invention than in conventional fastening portions constituted by a bolt and an internally threaded portion having no difference in hardness. The present invention can achieve enhanced friction at the fastening surface in the fastening portions as well as an increased area of contact at the fastening surface in the fastening portions. The present invention can thus improve the fastening torque.

It is also contemplated how to produce similar axial tensions among the multiple fastening portions. If a bolt of a high hardness and a bolt of a low hardness are tightened to the same internally threaded portion with substantially the same fastening torque, the bolt with low hardness may break. The bolt with a high hardness, on the contrary, rarely break. In order to stabilize the coefficient of friction, the present invention employs bolts with a high hardness, so that the surface roughness of the internally threaded portions can become similar to the surface roughness of the bolts. In addition, since the coefficient of friction is stabilized, the bolts can be saved from breaking even if substantially the same fastening torque is applied.

Example 1

To verify the mechanism, the eccentric oscillation gear device (transmission) 1 relating to the embodiment shown in FIGS. 1 to 4 was used to test the fastening in the fastening portions 100.

The test was conducted using a test piece and a bolt 101, which correspond to the fastening portions 100 of the eccentric oscillation gear device (transmission) 1. Specifically, the test piece had an internally threaded portion 200 corresponding to the fastening portions 100 and was split in half in the direction along the axis C5 of the internally threaded portion 200. The halves of the test piece were assembled together into the original condition, so that the internally threaded portion 200 restored the original shape. The internally threaded portion 200 of the test piece at least had a Rockwell hardness of HRC38. The externally threaded portion 103 of the bolt 101 at least had a Rockwell hardness of HRC44.

The bolt 101 was fastened to the internally threaded portion 200 of the test piece such that predetermined fastening toque was produced. The test piece was then disassembled to expose the inner surface of the internally threaded portion 200 and to remove the bolt 101 from the internally threaded portion 200. The surface roughness was then measured for the respective meshing surfaces of the internally and externally threaded portions 200 and 103. The surface roughness of the bolt 101 meshed with the internally threaded portion 200 was measured in the following manner. From among the threads of the bolt 101 that were in contact with the internally threaded portion 200, the roughness of the surface of the third and fourth threads from the head 104 was measured. In the same manner, the roughness of the surface of the corresponding threads of the internally threaded portion 200 was measured.

The following presents the specifications of the test piece, bolt 101 and fastening test.

Size of Bolt 101; M12
Standard Major Diameter (Nominal Diameter) of Externally Threaded Portion 103; 12 [mm]
Standard Effective Diameter of Externally Threaded Portion 103: 10.863 [mm]
Standard Minor Diameter of Externally Threaded Portion 103; 10.106 [mm]
Pitch: 1.75 [mm]
Standard Major Diameter (Nominal Diameter) of Internally Threaded Portion 200; 12 [mm]
Standard Effective Diameter of Internally Threaded Portion 200; 10.863 [mm]
Standard Minor Diameter of Internally Threaded Portion 200; 10.106 [mm]
Fundamental Triangle Height of Internally Threaded Portion 200; 1.516 [mm]
Pitch: 1.75 [mm]
Test Conditions
Fastening Torque: 156 [N-m]
Measured Surface Roughness; Ra (μm), Rpk (μm), Rv (μm)

From the measurement data, a suitable relationship between the surface roughness of the externally threaded portion and the surface roughness of the internally threaded portion was derived in the following manner. Tables 1 to 7 and FIGS. 7 to 12 show the relationship between the surface roughness of the externally threaded portion and the surface roughness of the internally threaded portion.

TABLE 1

| | Before Fastening | | | After Fastening | |
|---|---|---|---|---|---|
| | Internally Threaded HRC38 | Externally Threaded HRC44 | Image Of Contact | Internally Threaded HRC38 | Externally Threaded HRC44 |
| Roughness: Internally Threaded Portion > Externally Threaded Portion | Ra0.5~1.0 Rpk0.6~1.1 Rv0.6~1.1  | Ra0.2~0.5 Rpk0.2~0.6 Rv0.4~0.6 | 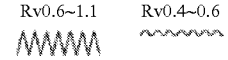 | Ra0.2~0.8 Rpk0.2~0.5 Rv0.6~1.1 Ra/Rpk Decreases | Ra0.2~0.5 Rpk0.2~0.6 Rv0.4~0.6 |
| Roughness: Internally Threaded Portion < Externally Threaded Portion | Ra0.3~0.5 Rpk0.2~0.6 Rv0.4~0.6 | Ra0.5~1.0 Rpk0.6~1.1 Rv0.6~1.1  | 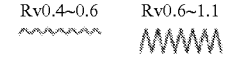 | Ra0.3~1.0 Rpk0.2~0.6 Rv0.6~1.1 Ra/Rv Increases | Ra0.5~1.0 Rpk0.6~1.1 Rv0.6~1.1 |
| Roughness: Internally Threaded = Externally Threaded | Ra0.3~0.5 Rv0.4~0.6 | Rpk0.2~0.6 |  | Ra0.3~0.5 Rpk0.2~0.4 Rv0.4~0.5  | Ra0.3~0.5 Rpk0.2~0.6 Rv0.4~0.6 |

TABLE 2

| | Suitable Value (MbRa = Minimum) | | | Suitable Value (MbRa = Maximum) | | |
|---|---|---|---|---|---|---|
| | MRa | FRa | RRa | MRa | FRa | RRa |
| FbRa > MbRa | 0.2 | 0.2 | 1.000 | 0.5 | 0.2 | 2.500 |
| | 0.2 | 0.3 | 0.667 | 0.5 | 0.3 | 1.667 |
| | 0.2 | 0.4 | 0.600 | 0.5 | 0.4 | 1.250 |
| | 0.2 | 0.5 | 0.400 | 0.5 | 0.5 | 1.000 |
| | 0.2 | 0.6 | 0.333 | 0.5 | 0.6 | 0.833 |
| | 0.2 | 0.7 | 0.286 | 0.5 | 0.7 | 0.714 |
| | 0.2 | 0.8 | 0.250 | 0.5 | 0.8 | 0.625 |
| FbRa < MbRa | 0.5 | 0.3 | 1.667 | 1.0 | 0.3 | 3.333 |
| | 0.5 | 0.4 | 1.250 | 1.0 | 0.4 | 2.500 |
| | 0.5 | 0.5 | 1.000 | 1.0 | 0.5 | 2.000 |
| | 0.5 | 0.6 | 0.833 | 1.0 | 0.6 | 1.667 |
| | 0.5 | 0.7 | 0.714 | 1.0 | 0.7 | 1.429 |
| | 0.5 | 0.8 | 0.625 | 1.0 | 0.8 | 1.250 |
| | 0.5 | 0.9 | 0.556 | 1.0 | 0.9 | 1.111 |
| | 0.5 | 1.0 | 0.500 | 1.0 | 1.0 | 1.000 |
| FbRa = MbRa | 0.3 | 0.3 | 1.000 | 0.5 | 0.3 | 1.667 |
| | 0.3 | 0.4 | 0.750 | 0.5 | 0.4 | 1.250 |
| | 0.3 | 0.5 | 0.600 | 0.5 | 0.5 | 1.000 |

TABLE 3

| Lower Limit Of Suitable Ra | | | Upper Limit Of Suitable Ra | | |
|---|---|---|---|---|---|
| MRa | FRa | RRa | MRa | FRa | RRa |
| 0.2 | 0.2 | 1.000 | 0.5 | 0.2 | 2.500 |
| 0.2 | 0.3 | 0.667 | 1.0 | 0.3 | 3.333 |
| 0.2 | 0.4 | 0.500 | 1.0 | 0.4 | 2.500 |
| 0.2 | 0.5 | 0.400 | 1.0 | 0.5 | 2.000 |
| 0.2 | 0.6 | 0.333 | 1.0 | 0.6 | 1.667 |

TABLE 3-continued

| Lower Limit Of Suitable Ra | | | Upper Limit Of Suitable Ra | | |
|---|---|---|---|---|---|
| MRa | FRa | RRa | MRa | FRa | RRa |
| 0.2 | 0.7 | 0.286 | 1.0 | 0.7 | 1.429 |
| 0.2 | 0.8 | 0.250 | 1.0 | 0.8 | 1.250 |
| 0.5 | 0.9 | 0.556 | 1.0 | 0.9 | 1.111 |
| 0.5 | 1.0 | 0.500 | 1.0 | 1.0 | 1.000 |

TABLE 4

| | Suitable Value (MbRpk = Minimum) | | | Suitable Value (MbRpk = Maximum) | | |
|---|---|---|---|---|---|---|
| | MRpk | FRpk | RRpk | MRpk | FRpk | RRpk |
| FbRpk | 0.2 | 0.2 | 1.000 | 0.5 | 0.2 | 2.500 |
| > | 0.2 | 0.3 | 0.667 | 0.5 | 0.3 | 1.667 |
| MbRpk | 0.2 | 0.4 | 0.500 | 0.5 | 0.4 | 1.250 |
| | 0.2 | 0.5 | 0.400 | 0.5 | 0.5 | 1.000 |
| FbRpk | 0.6 | 0.2 | 3.000 | 1.1 | 0.2 | 5.500 |
| < | 0.6 | 0.3 | 2.000 | 1.1 | 0.3 | 3.667 |
| MbRpk | 0.6 | 0.4 | 1.500 | 1.1 | 0.4 | 2.750 |
| | 0.6 | 0.5 | 1.200 | 1.1 | 0.5 | 2.200 |
| | 0.6 | 0.6 | 1.000 | 1.1 | 0.6 | 1.833 |
| FbRpk | 0.3 | 0.2 | 1.500 | 0.6 | 0.2 | 3.000 |
| = | 0.3 | 0.3 | 1.000 | 0.6 | 0.3 | 2.000 |
| MbRpk | 0.3 | 0.4 | 0.750 | 0.6 | 0.4 | 1.500 |

TABLE 5

| Lower Limit Of Suitable Rpk | | | Upper Limit Of Suitable Rpk | | |
|---|---|---|---|---|---|
| MRpk | FRpk | RRpk | MRpk | FRpk | RRpk |
| 0.2 | 0.2 | 1.000 | 1.1 | 0.2 | 5.500 |
| 0.2 | 0.3 | 0.667 | 1.1 | 0.3 | 3.667 |
| 0.2 | 0.4 | 0.500 | 1.1 | 0.4 | 2.750 |
| 0.2 | 0.5 | 0.400 | 1.1 | 0.5 | 2.200 |
| 0.6 | 0.6 | 1.000 | 1.1 | 0.6 | 1.833 |

TABLE 6

| | Suitable Value (MbRv = Minimum) | | | Suitable Value (MbRv = Maximum) | | |
|---|---|---|---|---|---|---|
| | MRv | FRv | RRv | MRv | FRv | RRv |
| FbRv | 0.4 | 0.6 | 0.667 | 0.6 | 0.6 | 1.000 |
| > | 0.4 | 0.7 | 0.571 | 0.6 | 0.7 | 0.857 |
| MbRv | 0.4 | 0.8 | 0.500 | 0.6 | 0.8 | 0.750 |
| | 0.4 | 0.9 | 0.444 | 0.6 | 0.9 | 0.667 |
| | 0.4 | 1.0 | 0.400 | 0.6 | 1.0 | 0.600 |
| | 0.4 | 1.1 | 0.364 | 0.6 | 1.1 | 0.545 |
| FbRv | 0.6 | 0.6 | 1.000 | 1.1 | 0.6 | 1.833 |
| < | 0.6 | 0.7 | 0.857 | 1.1 | 0.7 | 1.571 |
| MbRv | 0.6 | 0.8 | 0.750 | 1.1 | 0.8 | 1.375 |
| | 0.6 | 0.9 | 0.667 | 1.1 | 0.9 | 1.222 |
| | 0.6 | 1.0 | 0.600 | 1.1 | 1.0 | 1.100 |
| | 0.6 | 1.1 | 0.545 | 1.1 | 1.1 | 1.000 |
| FbRv | 0.4 | 0.4 | 1.000 | 0.6 | 0.4 | 1.500 |
| = | 0.4 | 0.5 | 0.800 | 0.6 | 0.5 | 1.200 |
| MbRv | | | | | | |

TABLE 7

| Lower Limit Of Suitable Rv | | | Upper Limit Of Suitable Rv | | |
|---|---|---|---|---|---|
| MRv | FRv | RRv | MRv | FRv | RRv |
| 0.4 | 0.4 | 1.000 | 0.6 | 0.4 | 1.500 |
| 0.4 | 0.5 | 0.800 | 0.6 | 0.5 | 1.200 |
| 0.4 | 0.6 | 0.667 | 1.1 | 0.6 | 1.833 |
| 0.4 | 0.7 | 0.571 | 1.1 | 0.7 | 1.571 |
| 0.4 | 0.8 | 0.500 | 1.1 | 0.8 | 1.375 |
| 0.4 | 0.9 | 0.444 | 1.1 | 0.9 | 1.222 |
| 0.4 | 1.0 | 0.400 | 1.1 | 1.0 | 1.100 |
| 0.4 | 1.1 | 0.364 | 1.1 | 1.1 | 1.000 |

Figure 7:
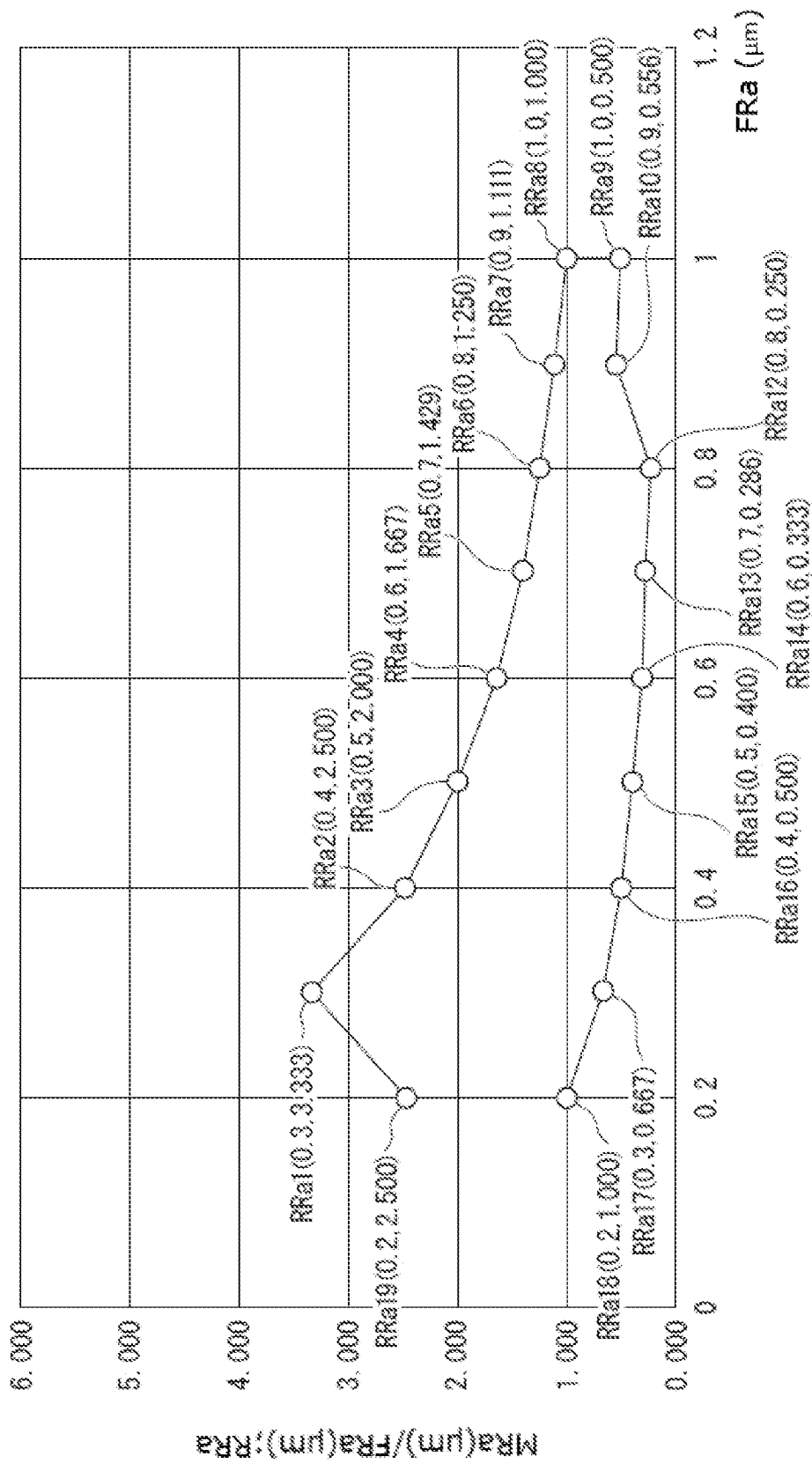
FIG. 7 shows the relation between FRa and RRa in the eccentric oscillation gear device relating to the present disclosure, where FRa (μm) denotes the surface roughness of the internally threaded portion, MRa (μm) denotes the surface roughness of the externally threaded portion, and RRa denotes the ratio of MRa to FRa.
Figure 8:
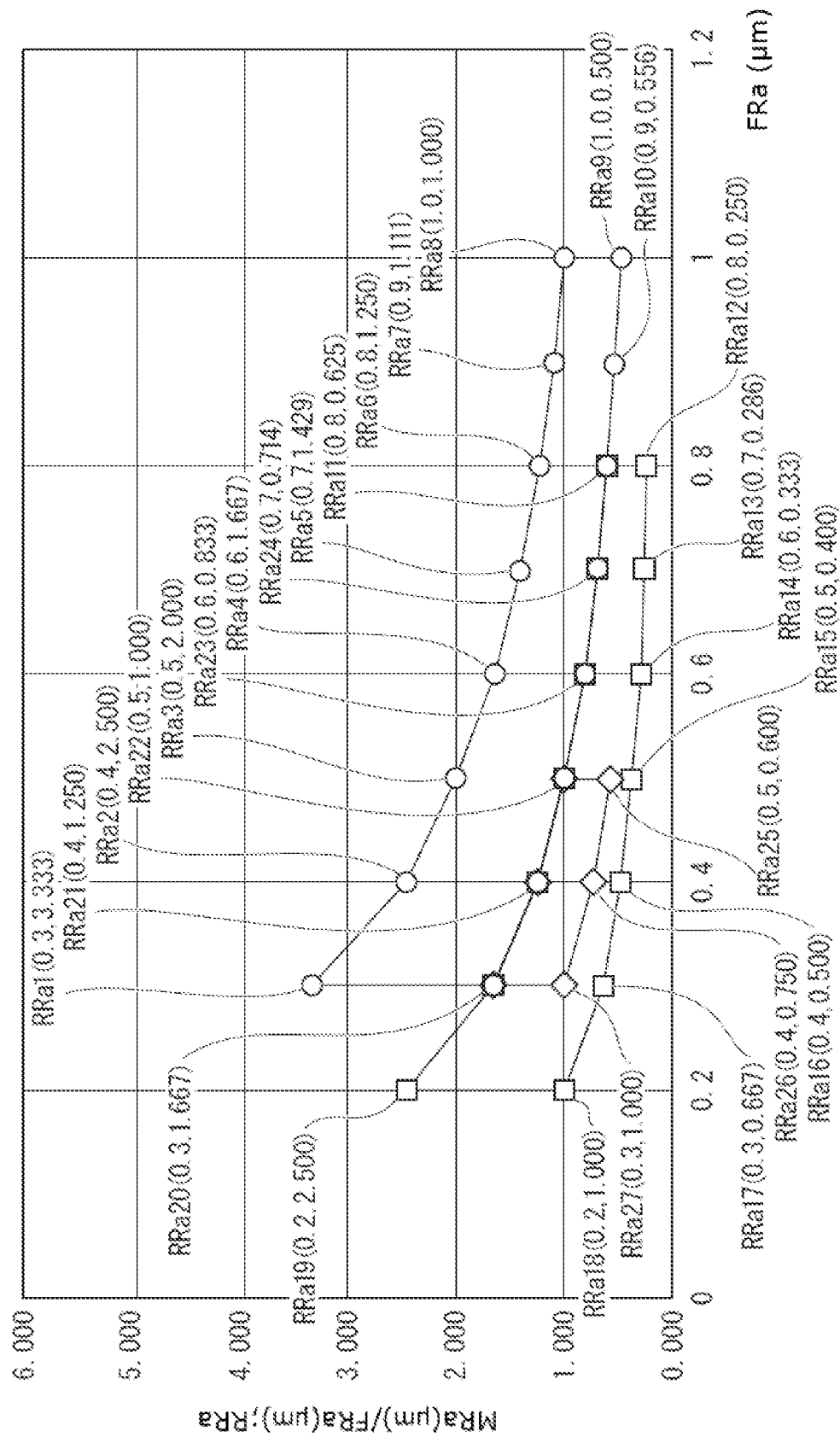
FIG. 8 shows the relation between FRa and RRa in the eccentric oscillation gear device relating to the present disclosure, where FRa (μm) denotes the surface roughness of the internally threaded portion, MRa (μm) denotes the surface roughness of the externally threaded portion, and RRa denotes the ratio of MRa to FRa.
Figure 9:
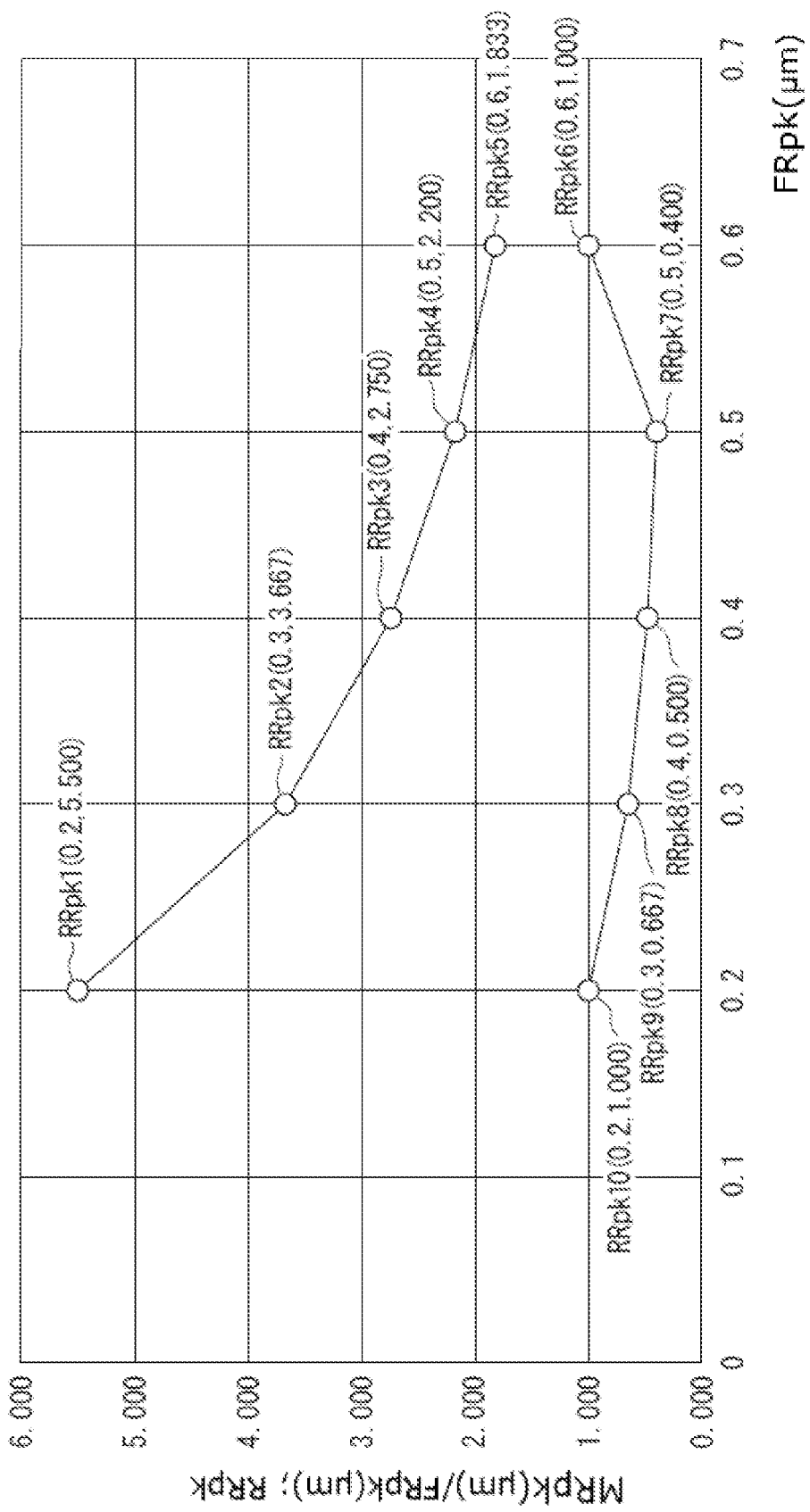
FIG. 9 shows the relation between FRpk and RRpk in the eccentric oscillation gear device relating to the present disclosure, where FRpk (μm) denotes the surface roughness of the internally threaded portion, MRpk (μm) denotes the surface roughness of the externally threaded portion, and RRpk denotes the ratio of MRpk to FRpk.
Figure 10:
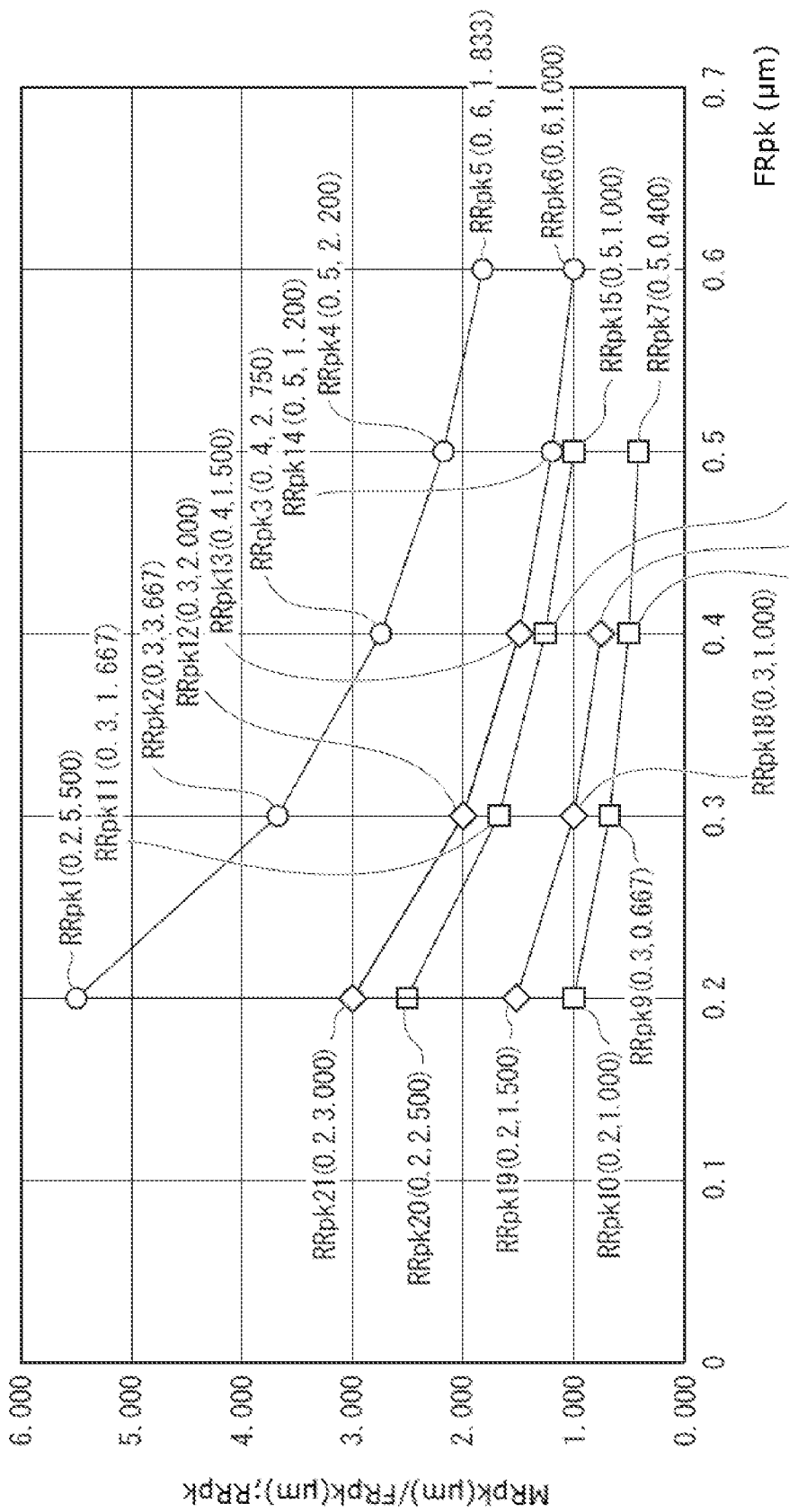
FIG. 10 shows the relation between FRpk and RRpk in the eccentric oscillation gear device relating to the present disclosure, where FRpk (μm) denotes the surface roughness of the internally threaded portion, MRpk (μm) denotes the surface roughness of the externally threaded portion, and RRpk denotes the ratio of MRpk to FRpk.
Figure 11:
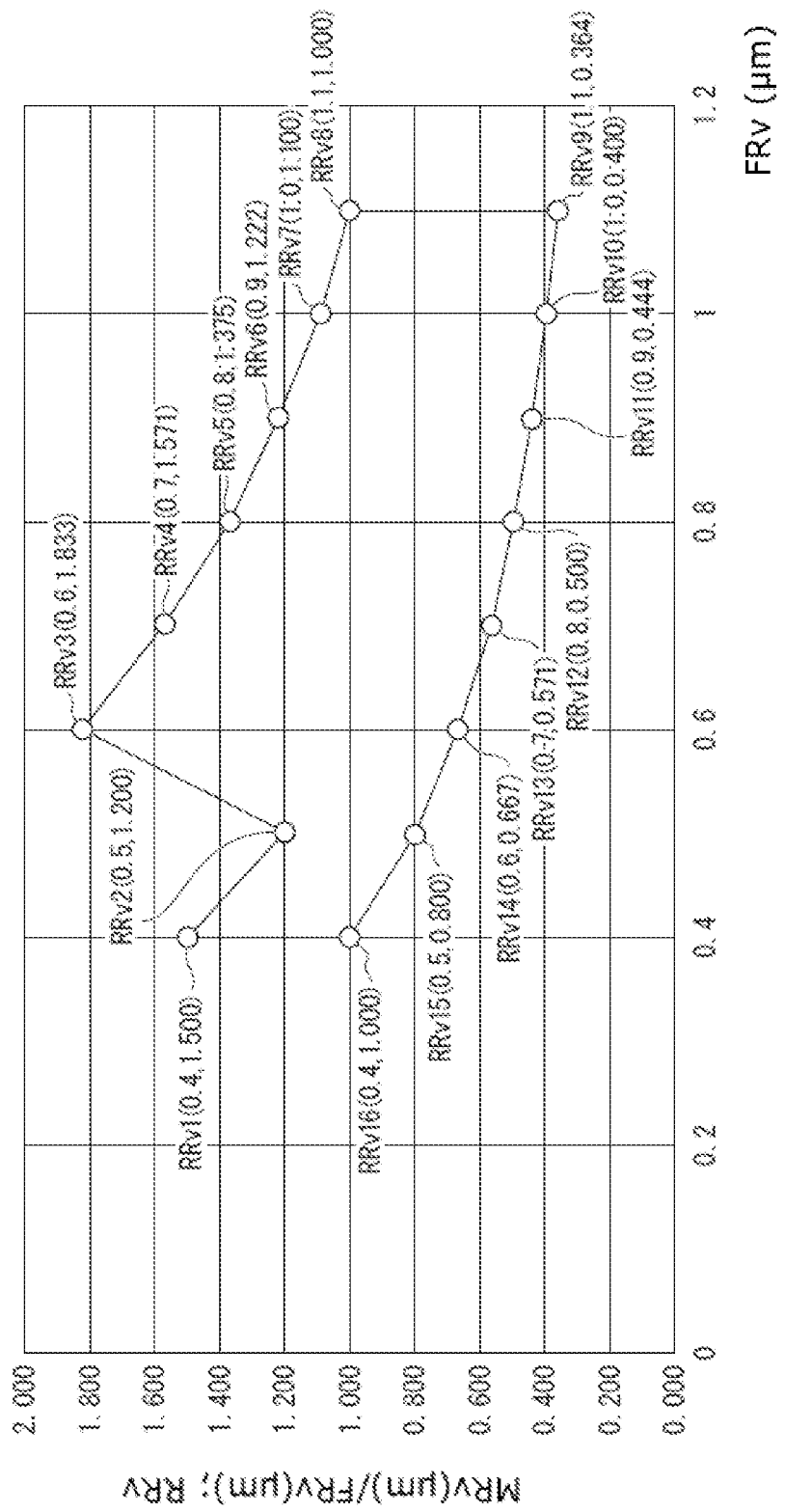
FIG. 11 shows the relation between FRv and RRv in the eccentric oscillation gear device relating to the present disclosure, where FRv (μm) denotes the surface roughness of the internally threaded portion, MRv (μm) denotes the surface roughness of the externally threaded portion, and RRv denotes the ratio of MRv to FRv.
Figure 12:
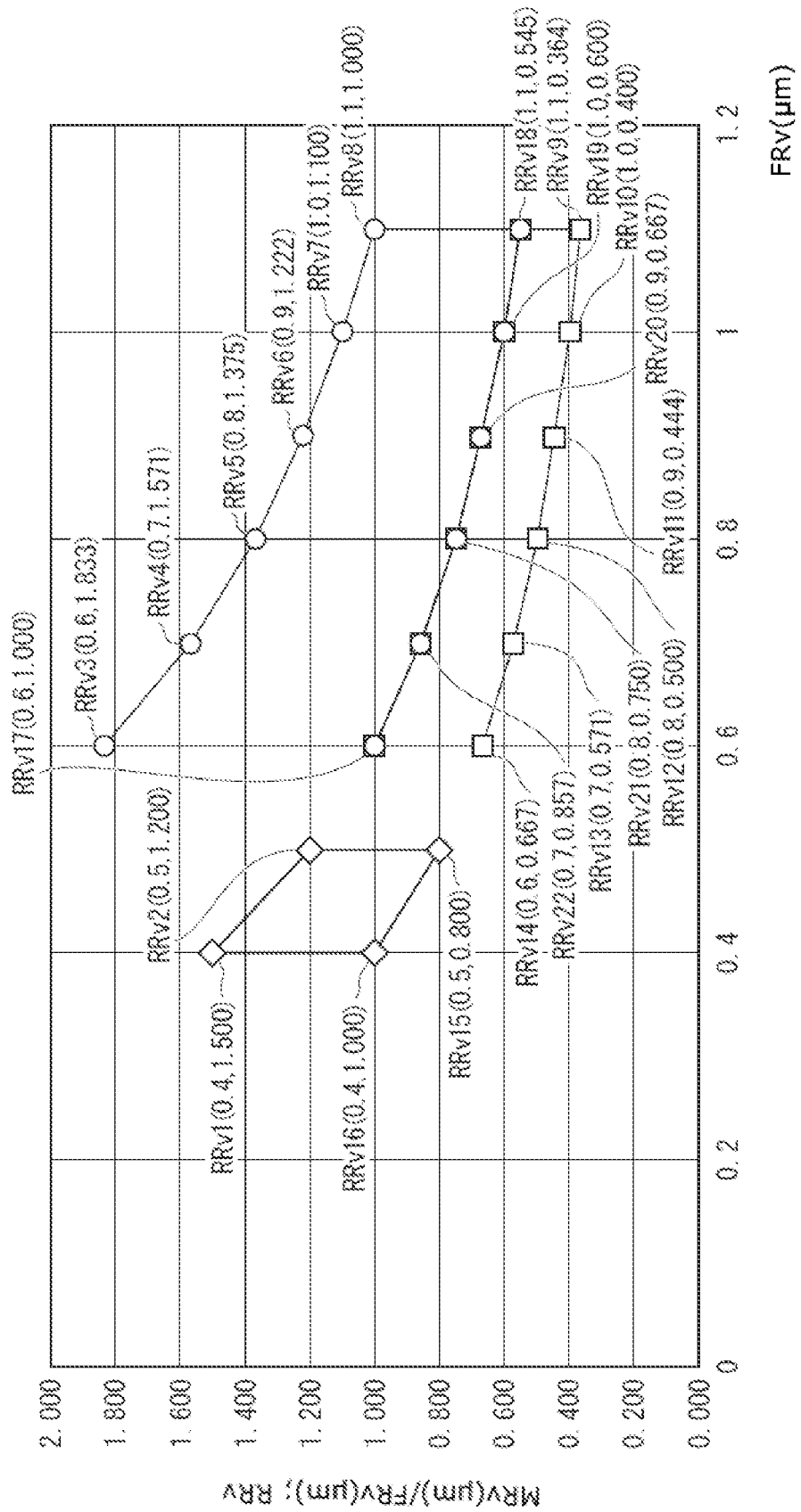
FIG. 12 shows the relation between FRv and RRv in the eccentric oscillation gear device relating to the present disclosure, where FRv (μm) denotes the surface roughness of the internally threaded portion, MRv (μm) denotes the surface roughness of the externally threaded portion, and RRv denotes the ratio of MRv to FRv.

FIG. 7 shows the relation between FRa and RRa in the eccentric oscillation gear device relating to the present disclosure, where FRa denotes the surface roughness of the internally threaded portion (μm), MRa denotes the surface roughness of the externally threaded portion (μm), and RRa denotes the ratio of MRa to FRa. FIG. 8 shows the relation between FRa and RRa in the eccentric oscillation gear device relating to the present disclosure, where FRa denotes the surface roughness of the internally threaded portion (μm), MRa denotes the surface roughness of the externally threaded portion (μm), and RRa denotes the ratio of MRa to FRa. FIG. 9 shows the relation between FRpk and RRpk in the eccentric oscillation gear device relating to the present disclosure, where FRpk denotes the surface roughness of the internally threaded portion (μm), MRpk denotes the surface roughness of the externally threaded portion (μm), and RRpk denotes the ratio of MRpk to FRpk. FIG. 10 shows the relation between FRpk and RRpk in the eccentric oscillation gear device relating to the present disclosure, where FRpk denotes the surface roughness of the internally threaded portion (μm), MRpk denotes the surface roughness of the externally threaded portion (μm), and RRpk denotes the ratio of MRpk to FRpk. FIG. 11 shows the relation between FRv and RRv in the eccentric oscillation gear device relating to the present disclosure, where FRv denotes the surface roughness of the internally threaded portion (μm), MRv denotes the surface roughness of the externally threaded portion (μm), and RRv denotes the ratio of MRv to FRv. FIG. 12 shows the relation between FRv and RRv in the eccentric oscillation gear device relating to the present disclosure, where FRv denotes the surface roughness of the internally threaded portion (μm), MRv denotes the surface roughness of the externally threaded portion (μm), and RRv denotes the ratio of MRv to FRv.

FIG. 7 shows a range where a suitable relation can be established between FRa and RRa, where FRa denotes the post-fastened surface roughness of the internally threaded portion (μm), MRa denotes the post-fastened surface roughness of the externally threaded portion (μm), and RRa denotes the ratio of MRa to FRa. The suitable relation can be derived from the data.

(4) The relation between MRa and FRa preferably satisfies the following conditions, where MRa (μm) denotes the surface roughness of the externally threaded portion after the fastening and the externally and internally threaded portions engage with each other, and FRa (μm) denotes the surface roughness of the internally threaded portion after the fastening. The surface roughness of the internally threaded portion FRa (μm) is preferably in the range of 0.2 to 1.0, and the ratio RRa=MRa/FRa preferably falls within the range of 0.25 to 3.333.

(5) The relation between MRa and FRa preferably satisfies the following conditions, where MRa (μm) denotes the surface roughness of the externally threaded portion after the fastening and the externally and internally threaded portions engage with each other and FRa (μm) denotes the surface roughness of the internally threaded portion after the fastening. The surface roughness of the internally threaded portion FRa (μm) and the ratio RRa=MRa/FRa are preferably within the range delineated by the following points as shown in FIG. 7, where the numerical values in the parentheses following each point respectively denote FRa and RRa. The points include a point RRa1 (0.3, 3.333), a point RRa2 (0.4, 2.500), a point RRa3 (0.5, 2.000), a point RRa4 (0.6, 1.667), a point RRa5 (0.7, 1.429), a point RRa6 (0.8, 1.250), a point RRa7 (0.9, 1.111), a point RRa8 (1.0, 1.000), a point RRa9 (1.0, 0.500), a point RRa10 (0.9, 0.556), a point RRa12 (0.8, 0.250), a point RRa13 (0.7, 0.286), a point RRa14 (0.6, 0.333), a point RRa15 (0.5, 0.400), a point RRa16 (0.4, 0.500), a point RRa17 (0.3, 0.667), a point RRa18 (0.2, 1.000), and a point RRa19 (0.2, 2.500).

When MbRa (μm) denotes the surface roughness of the externally threaded portion before the fastening and FbRa (μm) denotes the surface roughness of the internally threaded portion before the fastening, the relation between MbRa and FbRa may satisfy FbRa>MbRa. In this case, the relation between MRa (μm) and FRa (μm) preferably satisfies the following conditions, where MRa (μm) denotes the surface roughness of the externally threaded portion after the fastening and the externally and internally threaded portions engage with each other and FRa (μm) denotes the surface roughness of the internally threaded portion after the fastening. The surface roughness of the internally threaded portion FRa (μm) and the ratio RRa=MRa/FRa are preferably within the range delineated by the following points as shown in FIG. 8, where the numerical values in the parentheses following each point respectively denote FRa and RRa. The points include the point RRa19 (0.2, 2.500), a point RRa20 (0.3, 1.667), a point RRa21 (0.4, 1.250), a point RRa22 (0.5, 1.000), a point RRa23 (0.6, 0.833), a point RRa24 (0.7, 0.714), a point RRa11 (0.8, 0.625), the point RRa12 (0.8, 0.250), the point RRa13 (0.7, 0.286), the point RRa14 (0.6, 0.333), the point RRa15 (0.5, 0.400), the point RRa16 (0.4, 0.500), the point RRa17 (0.3, 0.667), and the point RRa18 (0.2, 1.000).

When MbRa (μm) denotes the surface roughness of the externally threaded portion before the fastening and FbRa (μm) denotes the surface roughness of the internally threaded portion before the fastening, the relation between MbRa and FbRa may satisfy FbRa<MbRa. In this case, the relation between MRa (μm) and FRa (μm) preferably satisfies the following conditions, where MRa (μm) denotes the surface roughness of the externally threaded portion after the fastening and the externally and internally threaded portions engage with each other and FRa (μm) denotes the surface roughness of the internally threaded portion after the fastening. The surface roughness of the internally threaded portion FRa (μm) and the ratio RRa=MRa/FRa are preferably within the range delineated by the following points as shown in FIG. 8, where the numerical values in the parentheses following each point respectively denote FRa and RRa. The points include the point RRa1 (0.3, 3.333), the point RRa2 (0.4, 2.500), the point RRa3 (0.5, 2.000), the point RRa4 (0.6, 1.667), the point RRa5 (0.7, 1.429), the point RRa6 (0.8, 1.250), the point RRa7 (0.9, 1.111), the point RRa8 (1.0, 1.000), the point RRa9 (1.0, 0.500), the point RRa10 (0.9, 0.556), the point RRa11 (0.8, 0.625), the point RRa24 (0.7, 0.714), the point RRa23 (0.6, 0.833), the point RRa22 (0.5, 1.000), the point RRa21 (0.4, 1.250), and the point RRa20 (0.3, 1.667).

When MbRa (μm) denotes the surface roughness of the externally threaded portion before the fastening and FbRa (μm) denotes the surface roughness of the internally threaded portion before the fastening, the relation between MbRa and FbRa may satisfy FbRa MbRa. In this case, the relation between MRa (μm) and FRa (μm) preferably satisfies the following conditions, where MRa (μm) denotes the surface roughness of the externally threaded portion after the fastening and the externally and internally threaded portions engage with each other and FRa (μm) denotes the surface roughness of the internally threaded portion after the fastening. The surface roughness of the internally threaded portion FRa (μm) and the ratio RRa=MRa/FRa are preferably within the range delineated by the following points as shown in FIG. 8, where the numerical values in the parentheses following each point respectively denote FRa and RRa. The points include the point RRa20 (0.3, 1.667), the point RRa21 (0.4, 1.250), the point RRa22 (0.5, 1.000), a point RRa25 (0.5, 0.600), a point RRa26 (0.4, 0.750), and a point RRa27 (0.3, 1.000).

FIG. 9 shows a range where a suitable relation can be established between FRpk and RRpk, where FRpk denotes the post-fastened surface roughness of the internally threaded portion (μm), MRpk denotes the post-fastened surface roughness of the externally threaded portion (μm), and RRpk denotes the ratio of MRpk to FRpk. The suitable relation can be derived from the data.

(6) The relation between MRpk and FRpk preferably satisfies the following conditions, where MRpk (μm) denotes the surface roughness of the externally threaded portion after the fastening and the externally and internally threaded portions engage with each other and FRpk (μm) denotes the surface roughness of the internally threaded portion after the fastening. The surface roughness of the internally threaded portion FRpk (μm) is within the range of 0.2 to 0.6. The ratio RRpk=MRpk/FRpk falls within the range of 0.4 to 5.5.

(7) The relation between MRpk and FRpk preferably satisfies the following conditions, where MRpk (μm) denotes the surface roughness of the externally threaded portion after the fastening and the externally and internally threaded portions engage with each other and FRpk (μm) denotes the surface roughness of the internally threaded portion after the fastening. The surface roughness of the internally threaded portion FRpk (μm) and the ratio RRpk=MRpk/FRpk are preferably within the range delineated by the following points as shown in FIG. 9, where the numerical values in the parentheses following each point respectively denote FRpk and RRpk. The points include a point RRpk1 (0.2, 5.500), a point RRpk2 (0.3, 3.667), a point RRpk3 (0.4, 2.750), a point RRpk4 (0.5, 2.200), a point RRpk5 (0.6, 1.833), a point RRpk6 (0.6, 1.000), a point RRpk7 (0.5, 0.400), a point RRpk8 (0.4, 0.500), a point RRpk9 (0.3, 0.667), and a point RRpk10 (0.2, 1.000).

When MbRpk (μm) denotes the surface roughness of the externally threaded portion before the fastening and FbRpk (μm) denotes the surface roughness of the internally threaded portion before the fastening, the relation between MbRpk and FbRpk may satisfy FbRpk>MbRpk. In this case, the relation between MRpk and FRpk preferably satisfies the following conditions, where MRpk (μm) denotes the surface roughness of the externally threaded portion after the fastening and the externally and internally threaded portions engage with each other and FRpk (μm) denotes the surface roughness of the internally threaded portion after the fastening. The surface roughness of the internally threaded portion FRpk (μm) and the ratio RRpk=MRpk/FRpk are preferably within the range delineated by the following points as shown in FIG. 10, where the numerical values in the parentheses following each point respectively denote FRpk and RRpk. The points include a point RRpk20 (0.2, 2.500), a point RRpk11 (0.3, 1.667), a point RRpk16 (0.4, 1.250), a point RRpk15 (0.5, 1.000), the point RRpk7 (0.5, 0.400), the point RRpk8 (0.4, 0.500), the point RRpk9 (0.3, 0.667), and the point RRpk10 (0.2, 1.000).

When MbRpk (μm) denotes the surface roughness of the externally threaded portion before the fastening and FbRpk (μm) denotes the surface roughness of the internally threaded portion before the fastening, the relation between MbRpk and FbRpk may satisfy FbRpk<MbRpk. In this case, the relation between MRpk and FRpk preferably satisfies the following conditions, where MRpk (μm) denotes the surface roughness of the externally threaded portion after the fastening and the externally and internally threaded portions engage with each other and FRpk (μm) denotes the surface roughness of the internally threaded portion after the fastening. The surface roughness of the internally threaded portion FRpk (μm) and the ratio RRpk=MRpk/FRpk are preferably within the range delineated by the following points as shown in FIG. 10, where the numerical values in the parentheses following each point respectively denote FRpk and RRpk. The points include the point RRpk1 (0.2, 5.500), the point RRpk2 (0.3, 3.667), the point RRpk3 (0.4, 2.750), the point RRpk4 (0.5, 2.200), the point RRpk5 (0.6, 1.833), the point RRpk6 (0.6, 1.000), a point RRpk14 (0.5, 1.200), a point RRpk13 (0.4, 1.500), a point RRpk12 (0.3, 2.000), and a point RRpk21 (0.2, 3.000).

When MbRpk (μm) denotes the surface roughness of the externally threaded portion before the fastening and FbRpk (μm) denotes the surface roughness of the internally threaded portion before the fastening, the relation between MbRpk and FbRpk may satisfy FbRpk≈MbRpk. In this case, the relation between MRpk and FRpk preferably satisfies the following conditions, where MRpk (μm) denotes the surface roughness of the externally threaded portion after the fastening and the externally and internally threaded portions engage with each other and FRpk (μm) denotes the surface roughness of the internally threaded portion after the fastening. The surface roughness of the internally threaded portion FRpk (μm) and the ratio RRpk=MRpk/FRpk are preferably within the range delineated by the following points as shown in FIG. 10, where the numerical values in the parentheses following each point respectively denote FRpk and RRpk. The points include the point RRpk21 (0.2, 3.000), the point RRpk12 (0.3, 2.000), the point RRpk13 (0.4, 1.500), a point RRpk17 (0.4, 0.750), a point RRpk18 (0.3, 1.000), and a point RRpk19 (0.2, 1.500).

FIG. 11 shows a range where a suitable relation can be established between FRv and RRv, where FRv denotes the post-fastened surface roughness of the internally threaded portion after the fastening (μm), MRv denotes the post-fastened surface roughness of the externally threaded portion (μm), and RRv denotes the ratio of MRv to FRv. The suitable relation can be derived from the data.

(8) The relation between MRv and FRv preferably satisfies the following conditions, where MRv (μm) denotes the surface roughness of the externally threaded portion after the fastening and the externally and internally threaded portions engage with each other: and FRv (μm) denotes the surface roughness of the internally threaded portion after the fastening. The surface roughness of the internally threaded portion FRv (μm) is within the range of 0.4 to 1.1. The ratio RRv=MRv/FRv falls within the range of 0.364 to 1.833.

(9) The relation between MRv and FRv preferably satisfies the following conditions, where MRv (μm) denotes the surface roughness of the externally threaded portion after the fastening and the externally and internally threaded portions engage with each other: and FRv (μm) denotes the surface roughness of the internally threaded portion after the fastening. The surface roughness of the internally threaded portion FRv (μm) and the ratio RRv=MRv/FRv are preferably within the range delineated by the following points as shown in FIG. 11, where the numerical values in the parentheses following each point respectively denote FRv and RRv. The points include a point RRv1 (0.4, 1.500), a point RRv2 (0.5, 1.200), a point RRv3 (0.6, 1.833), a point RRv4 (0.7, 1.571), a point RRv5 (0.8, 1.375), a point RRv6 (0.9, 1.222), a point RRv7 (1.0, 1.100), a point RRv8 (1.1, 1.000), a point RRv9 (1.1, 0.364), a point RRv10 (1.0, 0.400), a point RRv11 (0.9, 0.444), a point RRv12 (0.8, 0.500), a point RRv13 (0.7, 0.571), a point RRv14 (0.6, 0.667), a point RRv15 (0.5, 0.800), and a point RRv16 (0.4, 1.000).

When MbRv (μm) denotes the surface roughness of the externally threaded portion before the fastening and FbRv (μm) denotes the surface roughness of the internally threaded portion before the fastening, the relation between MbRv and FbRv may satisfy FbRv>MbRv. In this case, the relation between MRv and FRv preferably satisfies the following conditions, where MRv (μm) denotes the surface roughness of the externally threaded portion after the fastening and the externally and internally threaded portions engage with each other and FRv (μm) denotes the surface roughness of the internally threaded portion after the fastening. The surface roughness of the internally threaded portion FRv (μm) and the ratio RRv=MRv/FRv are preferably within the range delineated by the following points as shown in FIG. 12, where the numerical values in the parentheses following each point respectively denote FRv and RRv. The points include a point RRv17 (0.6, 1.000), a point RRv22 (0.7, 0.857), a point RRv21 (0.8, 0.750), a point RRv20 (0.9, 0.667), a point RRv19 (1.0, 0.600), a point RRv18 (1.1, 0.545), the point RRv9 (1.1, 0.364), the point RRv10 (1.0, 0.400), the point RRv11 (0.9, 0.444), the point RRv12 (0.8, 0.500), the point RRv13 (0.7, 0.571), and the point RRv14 (0.6, 0.667).

When MbRv (μm) denotes the surface roughness of the externally threaded portion before the fastening and FbRv (μm) denotes the surface roughness of the internally threaded portion before the fastening, the relation between MbRv and FbRv may satisfy FbRv<MbRv. In this case, the relation between MRv and FRv preferably satisfies the following conditions, where MRv (μm) denotes the surface roughness of the externally threaded portion after the fastening and the externally and internally threaded portions engage with each other and FRv (μm) denotes the surface roughness of the internally threaded portion after the fastening. The surface roughness of the internally threaded portion FRv (μm) and the ratio RRv=MRv/FRv are preferably within the range delineated by the following points as shown in FIG. 12, where the numerical values in the parentheses following each point respectively denote FRv and RRv. The points include the point RRv3 (0.6, 1.833), the point RRv4 (0.7, 1.571), a point RRv5 (0.8, 1.375), the point RRv6 (0.9, 1.222), the point RRv7 (1.0, 1.100), the point RRv8 (1.1, 1.000), a point RRv18 (1.1, 0.545), a point RRv19 (1.0, 0.600), the point RRv20 (0.9, 0.667), the point RRv21 (0.8, 0.750), the point RRv22 (0.7, 0.857), and the point RRv17 (0.6, 1.000).

When MbRv (μm) denotes the surface roughness of the externally threaded portion before the fastening and FbRv (μm) denotes the surface roughness of the internally threaded portion before the fastening, the relation between MbRv and FbRv may satisfy FbRv MbRv. In this case, the relation between MRv and FRv preferably satisfies the following conditions, where MRv (μm) denotes the surface roughness of the externally threaded portion after the fastening and the externally and internally threaded portions engage with each other and FRv (μm) denotes the surface roughness of the internally threaded portion after the fastening. The surface roughness of the internally threaded portion FRv (μm) and the ratio RRv=MRv/FRv are preferably within the range delineated by the following points as shown in FIG. 12, where the numerical values in the parentheses following each point respectively denote FRv and RRv. The points include the point RRv1 (0.4, 1.500), the point RRv2 (0.5, 1.200), the point RRv15 (0.5, 0.800), and the point RRv16 (0.4, 1.000).

The relation between the surface roughness of the internally threaded portion and the surface roughness of the externally threaded portion is determined to fall within any one of the ranges mentioned above, in order that the threads of the internally threaded portion having a lower hardness may plastically deform to conform to the threads of the externally threaded portion having a higher hardness when the bolt is fastened. The plastic deformation of the internally threaded portion conforming to the externally threaded portion takes place at the surface of the internally threaded portion that is in contact with the externally threaded portion. In other words, since the relation between the surface roughness characteristics is determined to fall within any one of the above-mentioned ranges, the micro-shapes on the surface of the threads of the internally threaded portion are plastically deformed to become more similar to the micro-shapes on the surface of the threads of the externally threaded portion as the bolt is fastened and the fastening force is resultantly applied. This mechanism is explained as follows. Due to the difference in hardness between the internally threaded portion and the externally threaded portion, the surface roughness of the threads of the internally threaded portion can become more similar to the surface roughness of the threads of the externally threaded portion when the bolt is fastened with the surfaces of their threads being in contact with each other.

These results indicate that the surface of the internally threaded portion may plastically deform to conform to the surface of the externally threaded portion, regardless of the surface roughness before the fastening, when the externally threaded portion has higher hardness than the internally threaded portion. In other words, the surface roughness of the internally threaded portion after the fastening preferably becomes more similar to the surface roughness of the externally threaded portion, which has a higher hardness, regardless of which one of the internally and externally threaded portions has higher surface roughness before the fastening. To achieve this favorable condition, the relation between the surface roughness of the internally threaded portion and the surface roughness of the externally threaded portion after the fastening is required to fall within any one of the above-mentioned ranges.

If the surface roughness of the internally threaded portion and the surface roughness of the externally threaded portion after the fastening fall within any one of the above-mentioned ranges, the surface of the internally threaded portion can become more similar to the surface of the externally threaded portion regardless of how the numerical value representing the surface roughness of the internally threaded portion is changed by the fastening. This can result in increasing the area of contact in the fastening portion, thereby improving the axial tension. If the surface roughness of the internally threaded portion and the surface roughness of the externally threaded portion after the fastening do not fall within any one of the above-mentioned ranges, on the other hand, the axial tension in the fastening portion can not be improved. This is not favorable since the axial tension may vary among the multiple fastening portions, which can lead to defects such as breakage.

Since the surface roughness of the internally threaded portion and the surface roughness of the externally threaded portion after the fastening are controlled to fall within any one of the above-mentioned ranges, the eccentric oscillation gear device relating to the present disclosure having the multiple fastening portions can keep the upper limit of the variation in axial tension lower than the bolt yield point. As a result, the present disclosure can achieve improved torque density so that the axial tension can be improved.

The following now describes how the size of the bolt is related to an increase in area of contact in the fastening portion and a rise in the fastening torque.

The following examined how the area of contact and the fastening torque changed as the size of the bolt changed and the pitch width determined by the size of the bolt resultantly changed. The area of contact A is calculated as follows.

$$A=(D^2-D_1^2)/4$$

Here, the parameters A, D, and $D_1$ are as follows.

A; Area of contact per thread of internally threaded portion [mm$^2$]
D; Nominal diameter of internally threaded portion [mm$^2$]
$D_1$; Standard minor diameter of internally threaded portion (D-1.0825P) [mm]
P; Pitch width of internally threaded portion [mm]

The size of the bolt, the pitch width [mm], the area of contact [mm$^2$], and the fastening torque [N-m] change as follows.

M5, 0.8, 6.21, 7.16
M6, 1.0, 9.28, 12.1
M8, 1.25, 15.57, 29.4
M10, 1.5, 23.44. 58.8
M12, 1.75, 32.89, 1.2
M14, 2, 43.93, 163
M16, 2, 50.73, 252
M18, 2.5, 70.77, 348
M20, 2.5, 79.27, 493

The value of the fastening torque is observed when the bolt is fastened with an axial tension being half the yield point of the bolt.

Based on these results, the fastening torque can be controlled depending on the size of the bolt. In response to the change in fastening torque, the range in which a suitable relation can be established between the surface roughness of the internally threaded portion and the surface roughness of the externally threaded portion can be correspondingly changed.

What is claimed is:
1. An eccentric oscillation gear device comprising:
a casing;
a first member supported by the casing via a first bearing;
a second member supported by the casing via a second bearing; and
a fastening portion fastening the first and second members in an axial direction of the casing, wherein the fastening portion includes:
an internally threaded portion formed in the first member; and
a fastener having an externally threaded portion, and
wherein the fastener has a Rockwell hardness (HRC) of 44 or higher, and the internally threaded portion has a lower hardness than the fastener.

2. The eccentric oscillation gear device of claim 1, wherein the internally threaded portion has a hardness less than a Brinell hardness (HB) 353.

3. The eccentric oscillation gear device of claim 1, wherein, in the fastening portion, a difference in hardness between the fastener and the internally threaded portion is greater than a Vickers hardness (HV) 62.

4. The eccentric oscillation gear device of claim 1, wherein, where MRa (μm) denotes surface roughness of the externally threaded portion after the fastening and the externally and internally threaded portions engage with each other and FRa (μm) denotes surface roughness of the internally threaded portion after the fastening,
the surface roughness of the internally threaded portion FRa (μm) is within a range of 0.2 to 1.0, and
a ratio RRa=MRa/FRa is within a range of 0.25 to 3.333.

5. The eccentric oscillation gear device of claim 4, wherein, where MRa (μm) denotes the surface roughness of the externally threaded portion after the fastening and the externally and internally threaded portions engage with each other, FRa (μm) denotes the surface roughness of the internally threaded portion after the fastening, and RRa denotes the ratio of MRa/FRa,
in an orthogonal coordinate system defined by a horizontal axis representing FRa and a vertical axis representing RRa=MRa/FRa, the surface roughness of the internally threaded portion FRa (μm) and the ratio RRa=MRa/FRa are within a range delineated by
a point RRa1 (0.3, 3.333), a point RRa2 (0.4, 2.500), a point RRa3 (0.5, 2.000), a point RRa4 (0.6, 1.667), a point RRa5 (0.7, 1.429), a point RRa6 (0.8, 1.250), a point RRa7 (0.9, 1.111), a point RRa8 (1.0, 1.000), a point RRa9 (1.0, 0.500), a point RRa10 (0.9, 0.556), a point RRa12 (0.8, 0.250), a point RRa13 (0.7, 0.286), a point RRa14 (0.6, 0.333), a point RRa15 (0.5, 0.400), a point RRa16 (0.4, 0.500), a point RRa17 (0.3, 0.667), a point RRa18 (0.2, 1.000), and a point RRa19 (0.2, 2.500), where numerical values in parentheses following each point respectively denote FRa and RRa.

6. The eccentric oscillation gear device of claim 1, wherein, where MRpk (μm) denotes surface roughness of the externally threaded portion after the fastening and the externally and internally threaded portions engage with each other and FRpk (μm) denotes surface roughness of the internally threaded portion after the fastening,
the surface roughness of the internally threaded portion FRpk (μm) is within a range of 0.2 to 0.6, and
a ratio RRpk=MRpk/FRpk is within a range of 0.4 to 5.5.

7. The eccentric oscillation gear device of claim 6, wherein, where MRpk (μm) denotes the surface roughness of the externally threaded portion after the fastening and the externally and internally threaded portions engage with each other, FRpk (μm) denotes the surface roughness of the internally threaded portion after the fastening, and RRpk denotes the ratio of MRpk/FRpk,
in an orthogonal coordinate system defined by a horizontal axis representing FRpk and a vertical axis representing RRpk=MRpk/FRpk, the surface roughness of the internally threaded portion FRpk (μm) and the ratio RRpk=MRpk/FRpk are within a range delineated by
a point RRpk1 (0.2, 5.500), a point RRpk2 (0.3, 3.667), a point RRpk3 (0.4, 2.750), a point RRpk4 (0.5, 2.200), a point RRpk5 (0.6, 1.833), a point RRpk6 (0.6, 1.000), a point RRpk7 (0.5, 0.400), a point RRpk8 (0.4, 0.500), a point RRpk9 (0.3, 0.667), and a point RRpk10 (0.2, 1.000), where numerical values in parentheses following each point respectively denote FRpk and RRpk.

8. The eccentric oscillation gear device of claim 1, wherein, where MRv (μm) denotes surface roughness of the externally threaded portion after the fastening and the externally and internally threaded portions engage with each other and FRv (μm) denotes surface roughness of the internally threaded portion after the fastening,
the surface roughness of the internally threaded portion FRv (μm) is within a range of 0.4 to 1.1, and
a ratio RRv=MRv/FRv is within a range of 0.364 to 1.833.

9. The eccentric oscillation gear device of claim 8, wherein, where MRv (μm) denotes the surface roughness of the externally threaded portion after the fastening and the externally and internally threaded portions engage with each other, FRv (μm) denotes the surface roughness of the internally threaded portion after the fastening, and RRv denotes the ratio of MRv/FRv,
in an orthogonal coordinate system defined by a horizontal axis representing FRv and a vertical axis representing RRv=MRv/FRv, the surface roughness of the internally threaded portion FRv (μm) and the ratio RRv=MRv/FRv are within a range delineated by
a point RRv1 (0.4, 1.500), a point RRv2 (0.5, 1.200), a point RRv3 (0.6, 1.833), a point RRv4 (0.7, 1.571), a point RRv5 (0.8, 1.375), a point RRv6 (0.9, 1.222), a point RRv7 (1.0, 1.100), a point RRv8 (1.1, 1.000), a point RRv9 (1.1, 0.364), a point RRv10 (1.0, 0.400), a point RRv11 (0.9, 0.444), a point RRv12 (0.8, 0.500), a point RRv13 (0.7, 0.571), a point RRv14 (0.6, 0.667), a point RRv15 (0.5, 0.800), and a point RRv16 (0.4, 1.000), where numerical values in parentheses following each point respectively denote FRv and RRv.

10. An eccentric oscillation gear device comprising:
a casing;
an internal gear provided on an inner circumference of the casing;
an external gear meshing with the internal gear;
an eccentric member for oscillating the external gear;
a first member supported by the casing via a first bearing;
a second member supported by the casing via a second bearing; and
a fastening portion fastening the first and second members in an axial direction of the casing,
wherein the fastening portion includes:
an internally threaded portion formed in the first member; and
a fastener having an externally threaded portion, and
wherein the fastener has a Rockwell hardness HRC of 44 or higher, and the internally threaded portion has a lower hardness than the fastener.

11. A robot comprising:
a plurality of members movably connected, the plurality of members including an arm,
a connecting portion rotatably connecting together the plurality of members including the arm; and
an eccentric oscillation gear device attached to the connecting portion,
wherein the eccentric oscillation gear device includes:
a casing;
a first member supported by the casing via a first bearing;

a second member supported by the casing via a second bearing; and a fastening portion fastening the first and second members in an axial direction of the casing, wherein the fastening portion includes:

an internally threaded portion formed in the first member; and a fastener having an externally threaded portion, and wherein the fastener has a Rockwell hardness HRC of 44 or higher, and the internally threaded portion has a lower hardness than the fastener.

* * * * *